(12) United States Patent
Morita

(10) Patent No.: US 7,350,706 B2
(45) Date of Patent: Apr. 1, 2008

(54) CONTACT-TYPE DATA COMMUNICATION APPARATUS, TRANSMISSION AND RECEPTION APPARATUS, AND TRANSMISSION AND RECEPTION METHOD

(75) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 11/305,472

(22) Filed: Dec. 15, 2005

(65) Prior Publication Data

US 2006/0131413 A1 Jun. 22, 2006

(30) Foreign Application Priority Data

Dec. 21, 2004 (JP) ............................ P2004-368671

(51) Int. Cl.
*G06K 7/08* (2006.01)
(52) U.S. Cl. ....................................... 235/451; 235/380
(58) Field of Classification Search ................ 235/451, 235/380, 382
See application file for complete search history.

(56) References Cited

U.S. PATENT DOCUMENTS

| 4,597,077 A | | 6/1986 | Nelson et al. |
| 5,799,171 A | * | 8/1998 | Kondou ......................... 703/27 |
| 6,003,777 A | * | 12/1999 | Kowalski ....................... 235/492 |
| 6,388,562 B1 | * | 5/2002 | Takiguchi et al. ........... 340/10.2 |
| 6,577,229 B1 | * | 6/2003 | Bonneau et al. ............ 340/10.41 |
| 6,839,772 B1 | * | 1/2005 | Kowalski et al. ............... 710/5 |
| 2004/0093436 A1 | | 5/2004 | Colnot |

FOREIGN PATENT DOCUMENTS

| JP | 11-203428 | 7/1999 |
| WO | WO00/14672 | 3/2000 |

* cited by examiner

*Primary Examiner*—Michael G. Lee
*Assistant Examiner*—Paultep Savusdiphol
(74) *Attorney, Agent, or Firm*—Bell, Boyd & Lloyd LLP

(57) ABSTRACT

A contact-type data communication apparatus, transmission and reception apparatus, and transmission and reception method. The transmission and reception apparatus for transmitting and receiving a command to and from a non-contact-type data communication apparatus and a contact-type data communication apparatus includes a transmission path for transmitting an electrical signal, to which one or more of the contact-type data communication apparatuses are connected electrically; a generation section for generating a transmission command for controlling the contact-type data communication apparatus; and a relay section for relaying the transmission command from the generation section and a first reply command from the contact-type data communication apparatus with respect to the first transmission command between the contact-type data communication apparatus and the generation section via the transmission path. The relay section relays the transmission command and the reply command by transmitting and receiving a coded signal to and from the contact-type data communication apparatus via the transmission path.

12 Claims, 14 Drawing Sheets

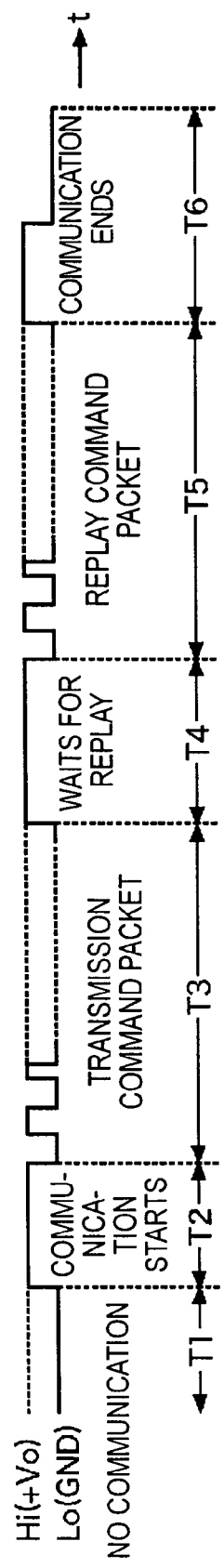

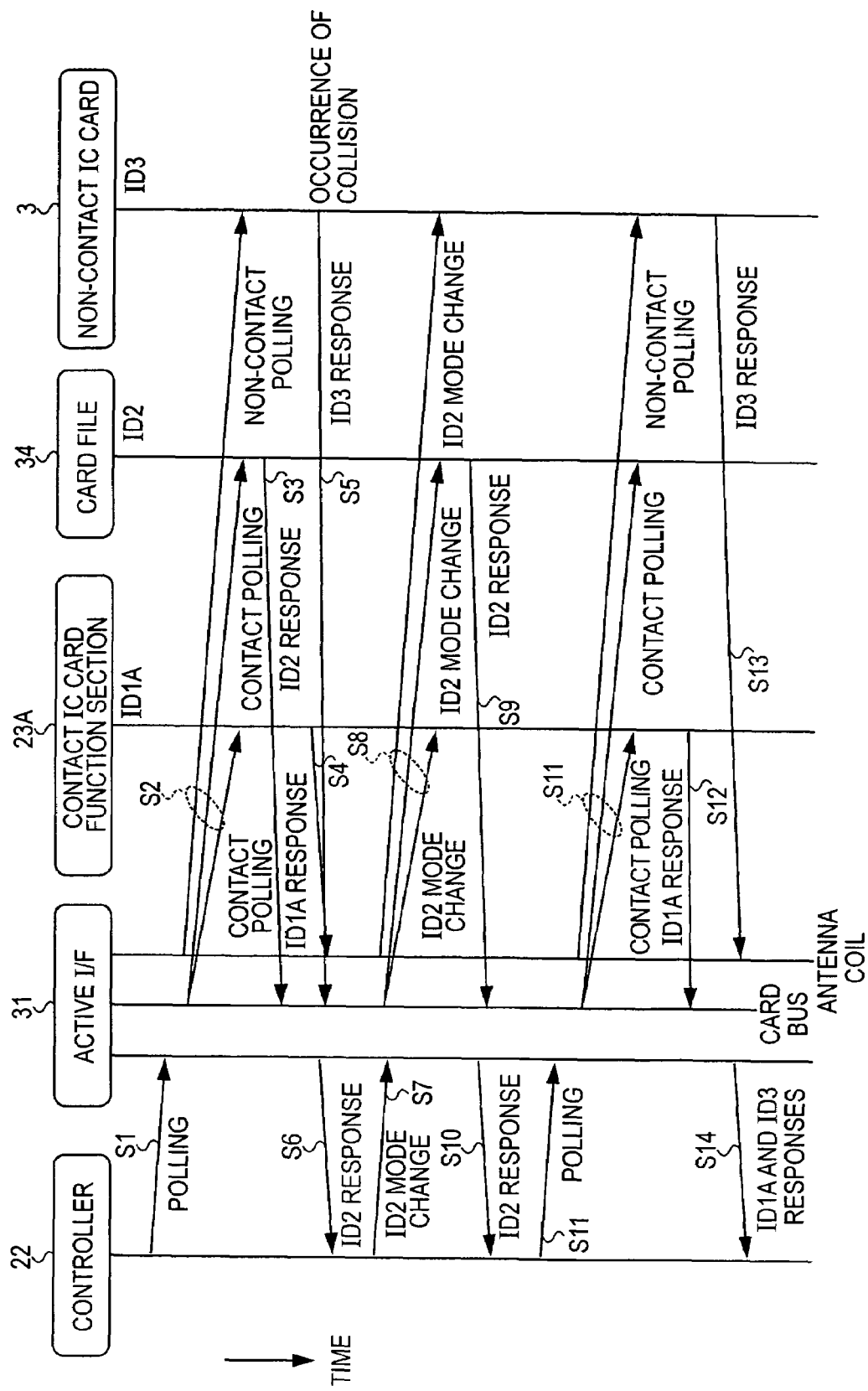

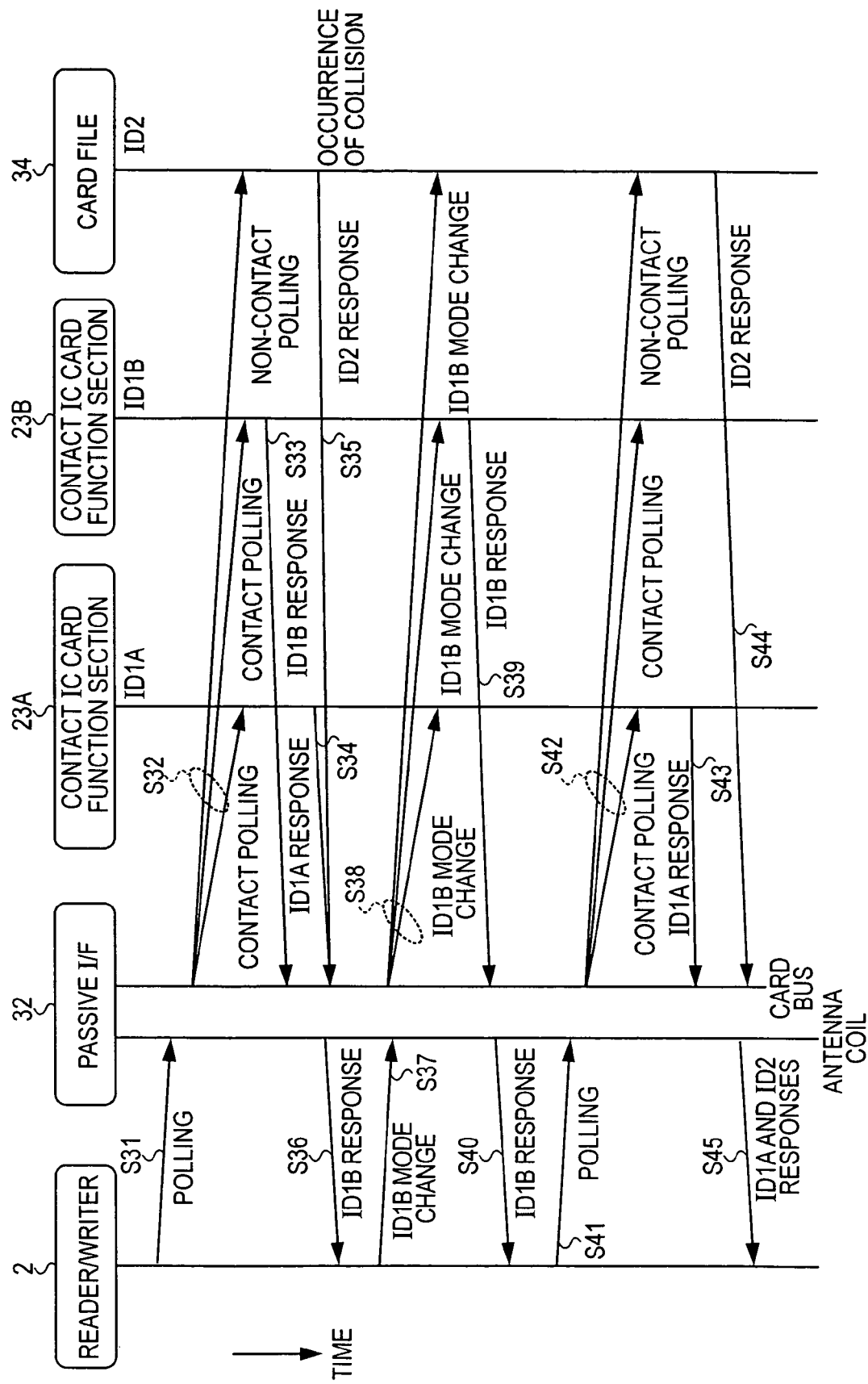

CONTACT-TYPE DATA COMMUNICATION APPARATUS, TRANSMISSION AND RECEPTION APPARATUS, AND TRANSMISSION AND RECEPTION METHOD

CROSS REFERENCE TO RELATED APPLICATIONS

The present application claims priority to Japanese Patent Application JP 2004-368671 filed in the Japanese Patent Office on Dec. 21, 2004, the entire contents of which is incorporated herein by reference.

BACKGROUND

The present invention relates to a contact-type data communication apparatus, a transmission and reception apparatus, and a transmission and reception method. More particularly, the present invention relates to a contact-type data communication apparatus capable of easily sharing a non-contact IC card and a contact IC card in an IC card communication system for performing communication with an IC card, to a transmission and reception apparatus for use therewith, and to a transmission and reception method for use therewith.

There are two types of known IC card communication systems for performing communication with an IC (Integrated Circuit) card: a contact-type IC card communication system for performing communication with an IC card in contact with a reader/writer; and a non-contact-type IC card communication system in which an IC card is not in contact with a reader/writer.

For example, in a non-contact-type IC card communication system, a non-contact reader/writer (non-contact-type reader/writer) generates an electromagnetic wave, thereby forming a so-called RF (Radio Frequency) field (magnetic field). Then, when a non-contact-type IC card (hereinafter, referred to as a "non-contact IC card") is brought into proximity with the non-contact reader/writer, the non-contact IC card receives the supply of power by electromagnetic inductance and performs communication of a command with the non-contact reader/writer.

There is a known non-contact-type IC card communication system in which a plurality of non-contact IC cards communicate with one non-contact-type reader/writer (hereinafter, referred to as a "non-contact reader/writer"). Also, there is a known contact-type IC card communication system in which a plurality of contact IC cards communicate with one contact reader/writer (refer to, for example, Japanese Unexamined Patent Application Publication No. 11-203428).

However, the communication method of the non-contact-type IC card communication system differs from the communication method of the contact-type IC card communication system. Therefore, in order to allow both a non-contact IC card and a contact IC card to perform communication with each other by using one reader/writer, for example, the reader/writer needs to be provided with two types of communication methods of non-contact type and contact type. For this reason, it is common practice that one of the non-contact-type and contact-type IC card communication systems is adopted depending on the properties of the application.

SUMMARY

The present invention has been made in view of such circumstances. It is desirable to be capable of easily sharing a non-contact IC card and a contact IC card in an IC card communication system.

According to an embodiment of the present invention, there is provided a transmission and reception apparatus including: a transmission path for transmitting an electrical signal, to which one or more of the contact-type data communication apparatuses are connected electrically; generation means for generating a first transmission command for controlling the contact-type data communication apparatus; and first relay means for relaying a first transmission command from the generation means and a first reply command from the contact-type data communication apparatus with respect to the first transmission command between the contact-type data communication apparatus and the generation means via the transmission path, wherein the first relay means relays the first transmission command and the first reply command by transmitting and receiving a coded signal, such that the first transmission command and the first reply command are coded by the same coding method as the coding method used in the non-contact-type data communication apparatus, to and from the contact-type data communication apparatus via the transmission path.

The first relay means can transmit a transmission start signal indicating that the first transmission command is to be transmitted to the contact-type data communication apparatus via the transmission path before the first transmission command is transmitted to the contact-type data communication apparatus.

When the contact-type data communication apparatus is made to transmit a command to another contact-type data communication apparatus, the generation means can generate the first transmission command indicating the fact of command transmission so as to contain a command code of a communication command between the data communication apparatuses, the first relay means can transmit the first transmission command containing the command code of the communication command between the data communication apparatuses to the contact-type data communication apparatus, and the contact-type data communication apparatus can receive the first transmission command containing the command code of the communication command between the data communication apparatuses via the transmission path and can transmit the command to the other contact-type data communication apparatus.

As an anti-collision protocol when a command is transmitted and received to and from the contact-type data communication apparatus, the same anti-collision protocol as that of the non-contact-type data communication apparatus can be used.

The transmission and reception apparatus can further include second relay means for relaying a second transmission command for the contact-type data communication apparatus, which is transmitted in the form of radio waves from another apparatus, and a second reply command with respect to the second transmission command from the contact-type data communication apparatus between the other apparatus and the contact-type data communication apparatus via the transmission path, wherein the second relay means relays the second transmission command and the second reply command by transmitting and receiving a coded signal, such that the second transmission command and the second reply command are coded by the same coding method as the coding method used in the noncontact-type data communication apparatus, to and from the contact-type data communication apparatus via the transmission path.

The second relay means can further include power detection means for detecting power from the radio waves, and when the power detected by the power detection means is a predetermined or greater power, the second relay means can relay the second transmission command and the second reply command.

The second relay means can further include output means for outputting, to the first relay means, a prohibition signal for prohibiting the transmission of the first transmission command for the contact-type data communication apparatus when a predetermined code is detected from within the coded signal of the second transmission command.

According to another embodiment of the present invention, there is provided a first transmission and reception method including the steps of: generating a transmission command for controlling the contact-type data communication apparatus; and relaying the transmission command and a reply command by transmitting and receiving a coded signal, such that the transmission command and the reply command are coded by the same coding method as the coding method used in the non-contact-type data communication apparatus, to and from the contact-type data communication apparatus via the transmission path.

In the transmission and reception apparatus and the first transmission and reception method according to the embodiments of the present invention, a transmission command for controlling the contact-type data communication apparatus is generated, and a coded signal such that the transmission command and a reply command are coded by the same coding method as the coding method used in the non-contact-type data communication apparatus is transmitted and received to and from the contact-type data communication apparatus via the transmission path. As a result, the transmission command and the reply command are relayed.

According to another embodiment of the present invention, there is provided a contact-type data communication apparatus including: electrical signal input means for inputting an electrical signal; detection means for detecting a transmission start signal indicating that a transmission command is to be transmitted from the transmission and reception apparatus on the basis of the electrical signal input from the electrical signal input means; receiving means for receiving, as a transmission command, a coded signal such that the transmission command is coded by the same coding method as that used in the non-contact-type data communication apparatus, which is represented by the electrical signal input from the electrical signal input means, when the transmission start signal is detected by the detection means; and transmission means for coding a reply command, which is a command of a reply with respect to the transmission command, by the coding method and transmitting the reply command.

The contact-type data communication apparatus can further include generation means for generating a new transmission command further containing a communication apparatus ID for identifying the contact-type data communication apparatus itself in the transmission command when a command code contained in the transmission command received by the receiving means represents a communication command between data communication apparatuses for transmitting the command to another contact-type data communication apparatus, wherein the transmission means codes the new transmission command by the coding method and transmits the transmission command to the other contact-type data communication apparatus.

According to another embodiment of the present invention, there is provided a second transmission and reception method including the steps of: detecting a transmission start signal indicating that a transmission command is to be transmitted from the transmission and reception apparatus on the basis of an electrical signal input from the electrical signal input means; receiving, as a transmission command, a coded signal such that the transmission command is coded by the same coding method as the coding method used in the non-contact-type data communication apparatus, which is represented by the electrical signal input from the electrical signal input means, when the transmission start signal is detected; and coding a reply command, which is a command of a reply with respect to the transmission command, by the coding method and transmitting the reply command.

In the contact-type data communication apparatus and the second transmission and reception method according to the embodiments of the present invention, when a transmission start signal indicating that a transmission command is to be transmitted from the transmission and reception apparatus is detected on the basis of an electrical signal input from the electrical signal input means, a coded signal such that the transmission command is coded by the same coding method as the coding method used in the non-contact-type data communication apparatus, which is represented by the electrical signal input from the electrical signal input means, is received as a transmission command, and a reply command, which is a command of a reply for the received transmission command, is coded by the coding method and is transmitted.

According to the embodiments of the present invention, in an IC card communication system, it is possible to easily share a non-contact IC card and a contact IC card.

Additional features and advantages are described herein, and will be apparent from, the following Detailed Description and the figures.

BRIEF DESCRIPTION OF THE FIGURES

FIG. 2 shows an example of the structure of command packets.

FIG. 3 illustrates an electrical signal that is transmitted through a card bus 35.

FIG. 4 illustrates the transmission and reception of a command by a time slot method.

FIG. 5 illustrates the transmission and reception of a command by the time slot method.

DETAILED DESCRIPTION

Figure 1:
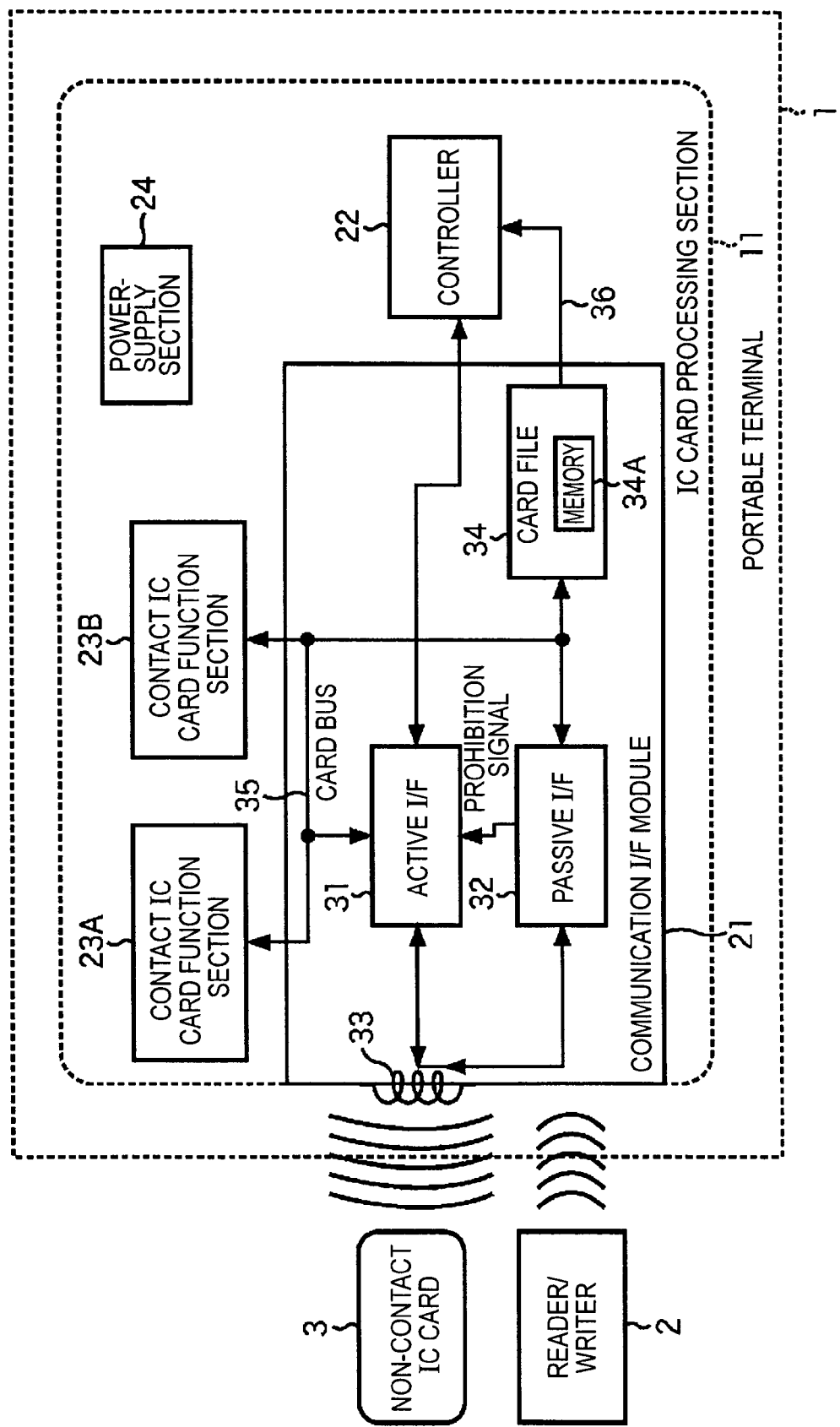
FIG. 1 is a block diagram showing an example of the configuration of an embodiment of a portable terminal to which the present invention is applied.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, there is provided a transmission and reception apparatus (for example, an IC card processing section 11 of FIG. 1) for transmitting and receiving a command to and from a non-contact-type data communication apparatus (for example, a non-contact IC card 3 of FIG. 1) and a contact-type data communication apparatus (for example, a contact IC card function section 23A of FIG. 1), the transmission and reception apparatus including: a transmission path (for example, a card bus 35 of FIG. 1) for transmitting an electrical signal, to which one or more of contact-type data communication apparatuses are connected electrically; generation means (for example, a controller 22 of FIG. 1) for generating a first transmission command for controlling the contact-type data communication apparatus; and first relay means (for example, an active I/F 31 of FIG. 1) for relaying a first transmission command from the generation means and a first reply command from the contact-type data communication apparatus with respect to the first transmission command between the contact-type data communication apparatus and the generation means via the transmission path, wherein the first relay means relays the first transmission command and the first reply command by transmitting and receiving a coded signal such that the first transmission command and the first reply command are coded by the same coding method as the coding method used in the non-contact-type data communication apparatus, to and from the contact-type data communication apparatus via the transmission path.

The transmission and reception apparatus according to an embodiment of the present invention further includes second relay means (for example, a passive I/F 32 of FIG. 1) for relaying, via the transmission path, a second transmission command for the contact-type data communication apparatus, which is transmitted in the form of radio waves from another apparatus, and a second reply command from the contact-type data communication apparatus with respect to the second transmission command between the other apparatus (for example, a reader/writer 2 of FIG. 1) and the contact-type data communication apparatus (for example, a contact IC card function section 23A of FIG. 1), wherein the second relay means relays the second transmission command and the second reply command by transmitting and receiving a coded signal, such that the second transmission command and the second reply command are coded by the same coding method as the coding method used in the non-contact-type data communication apparatus, to and from the contact-type data communication apparatus via the transmission path.

The transmission and reception apparatus according to an embodiment of the present invention further includes power detection means (for example, a power detection section 231 of FIG. 10) for detecting power from the radio waves, and when the power detected by the power detection means is a predetermined or greater power, the second relay means relays the second transmission command and the second reply command.

In the transmission and reception apparatus according to an embodiment of the present invention, the second relay means further includes output means (for example, a control section 233 of FIG. 10) for outputting, to the first relay means, a prohibition signal for prohibiting the transmission of the first transmission command for the contact-type data communication apparatus when a predetermined code is detected from within the coded signal of the second transmission command.

Figure 7:
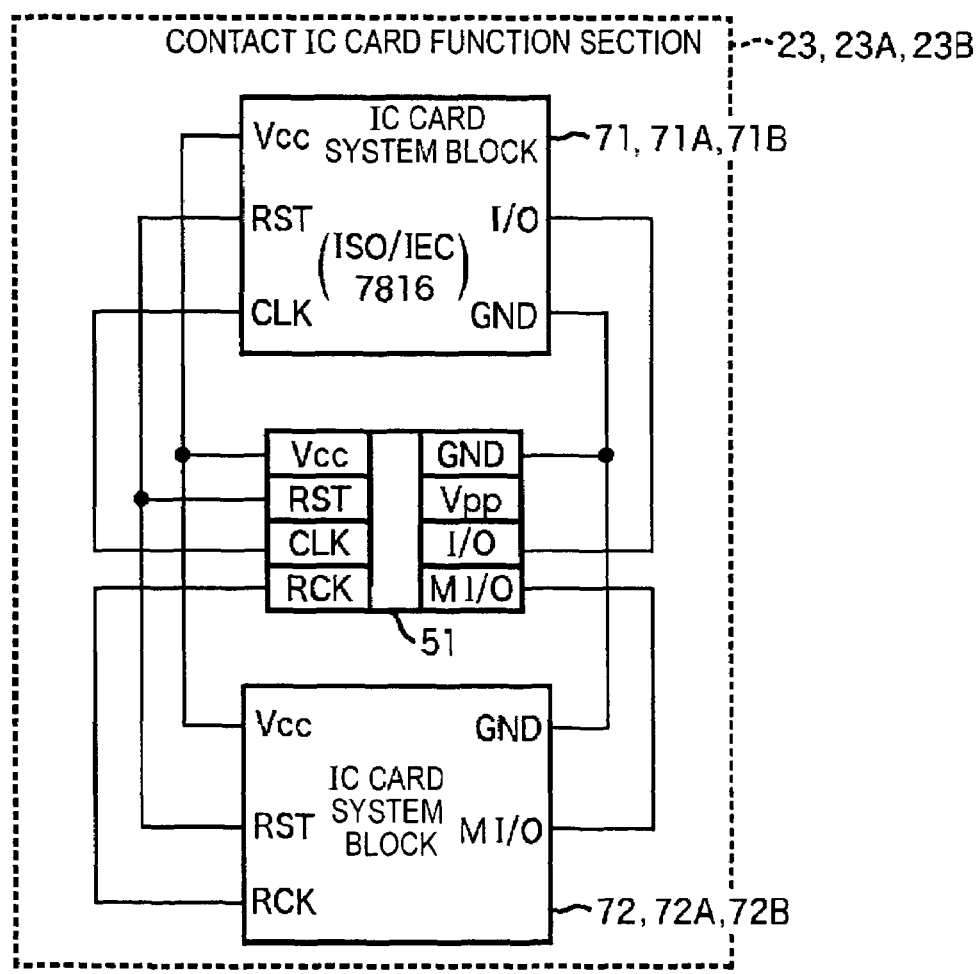
FIG. 7 shows the details and connection of a contact terminal section 51 of FIG. 6.

According to another embodiment of the present invention, there is provided a contact-type data communication apparatus (for example, a contact IC card function section 23A or 23B of FIG. 1) for transmitting and receiving a command to and from a transmission and reception apparatus (for example, an IC card processing section 11 of FIG. 1) capable of transmitting and receiving a command also to and from a non-contact-type data communication apparatus (for example, a non-contact IC card 3 of FIG. 1), the contact-type data communication apparatus including: electrical signal input means (for example, an M I/O terminal of a contact terminal section 51 of FIG. 7) for inputting an electrical signal; detection means (for example, a signal detection section 271 of FIG. 11) for detecting a transmission start signal indicating that a transmission command is to be transmitted from the transmission and reception apparatus on the basis of the electrical signal input from the electrical signal input means; receiving means (for example, a reception section 261 of FIG. 11) for receiving, as a transmission command, a coded signal such that the transmission command is coded by the same coding method as that used in the non-contact-type data communication apparatus, which is represented by the electrical signal input from the electrical signal input means, when the transmission start signal is detected by the detection means; and transmission means (for example, a transmission section 265 of FIG. 11) for coding a reply command, which is a command of a reply with respect to the transmission command, by the coding method and transmitting the reply command.

The contact-type data communication apparatus according to the embodiment of the present invention further includes generation means (for example, a control section 262 of FIG. 11) for generating a new transmission command further containing a communication apparatus ID for identifying the contact-type data communication apparatus itself in the transmission command when a command code contained in the transmission command received by the receiving means indicates a communication command between data communication apparatuses for transmitting a command to another contact-type data communication apparatus, wherein the transmission means codes the new transmission command by the coding method and transmits the transmission command to the other contact-type data communication apparatus.

An embodiment of the present invention will now be described below with reference to the drawings.

FIG. 1 shows an example of the configuration of a portable terminal to which the present invention is applied.

A portable terminal 1 of FIG. 1 is adapted to perform communication (transmission and reception of commands) with a reader/writer (non-contact reader/writer) 2 or a non-contact IC card (non-contact-type data communication apparatus) 3 in a non-contact manner by using electromagnetic waves. Here, the portable terminal 1 is assumed to be, for example, a cellular phone whose main processing is a wireless telephone communication function. Alternatively, the portable terminal 1 may be another terminal, such as a PDA (Personal Digital Assistant).

In a state in which the portable terminal 1 and the reader/writer 2 are brought into proximity with each other by a user by, for example, holding the portable terminal 1 up to the reader/writer 2, the reader/writer 2 radiates electromagnetic waves in order to transmit a predetermined command to the portable terminal 1. The portable terminal 1 receives the command transmitted from the reader/writer 2 and performs a process corresponding to the command.

Furthermore, in a state in which the portable terminal 1 and the non-contact IC card 3 are brought into proximity with each other by the user by, for example, holding the non-contact IC card 3 up to the portable terminal 1, the portable terminal 1 radiates electromagnetic waves in order to transmit a predetermined command to the non-contact IC card 3. The non-contact IC card 3 receives the command transmitted from the portable terminal 1 and performs a process corresponding to the command.

For example, it is assumed that a contact IC card function section 23A (to be described later) attached to the portable terminal 1 is an IC card for electronic money having a function for performing a receipt and payment of money process for electronic money. As a result of the reader/writer 2 provided in a register in a convenience store, etc., and the portable terminal 1 communicating with each other (transmitting and receiving a command), a commodity can be purchased by the electronic money stored (charged) in the contact IC card function section 23A. In this case, the portable terminal 1 and the reader/writer 2 transmit and receive a command (data) about electronic money.

In this embodiment, it is assumed that the reader/writer 2 or the non-contact IC card 3 is brought into proximity with the portable terminal 1 as necessary in a range (distance) in which it can be communicated with the portable terminal 1. The reader/writer 2 and the non-contact IC card 3 of FIG. 1 is identical to those of the related art, and accordingly, detailed descriptions of the configuration are omitted. A description is given of the detailed configuration of the portable terminal 1 that communicates with the reader/writer 2 and the non-contact IC card 3.

The portable terminal 1 includes at least an IC card processing section 11 in addition to a telephone communication processing section (not shown) for performing a telephone communication process as a telephone set.

The IC card processing section 11 includes a communication I/F (Interface) module 21, a controller 22, contact IC card function sections 23A and 23B, and a power-supply section 24, and manages (controls) the transmission and reception of commands with the reader/writer 2, the non-contact IC card 3, the contact IC card function section 23A, and the contact IC card function section 23B. Here, commands to be transmitted and received include a command having data stored therein, and therefore, the transmission and reception of a command includes the transmission and reception of data.

The contact IC card function sections (contact-type data communication apparatuses) 23A and 23B are able to transmit and receive a command by both a method of transmitting and receiving a command of a contact IC card, which is defined by ISO/IEC7816 (International Organization for Standardization/International Electro Technical Commission) (hereinafter, referred to as a "traditional transmission and reception method"), and a transmission and reception method that uses a coded signal, which is identical to that when the non-contact IC card 3 transmits and receives a command by using electromagnetic waves (radio waves) (hereinafter, referred to as a "new transmission and reception method"). The contact IC card function sections 23A and 23B are able to perform a process corresponding to a command received by each method (a process corresponding to a command received by the traditional transmission and reception method is referred to as a traditional process, and a process corresponding to a command received by the new transmission and reception method is referred to as a new process). However, the traditional process of the contact IC card function sections 23A and 23B is identical to the process performed in the traditional contact IC card, and accordingly, descriptions thereof are omitted. A description is given below of the new process performed by the contact IC card function sections 23A and 23B. In this embodiment, when the contact IC card function sections 23A and 23B need not to be particularly distinguished from each other, the contact IC card function section 23A or 23B is referred to simply as a "contact IC card function section 23".

The communication I/F module 21 relays a command transmitted and received between the controller 22; and the contact IC card function sections 23A and 23B, or the non-contact IC card 3. Furthermore, the communication I/F module 21 relays a command transmitted and received between the reader/writer 2; and the controller 22, or the contact IC card function sections 23A and 23B.

The communication I/F module 21 includes an active I/F 31, a passive I/F 32, an antenna coil 33, a card file 34, and a card bus 35.

The active I/F 31 relays a command transmitted and received between the controller 22; and the non-contact IC card 3, or the contact IC card function section 23A or 23B. For example, the active I/F 31 relays, via a card bus 35, a command of a transmission (transmission command) from the controller 22 and a command of a reply (reply command) from the contact IC card function section 23A or 23B with respect to the transmission command between the contact IC card function section 23A or 23B and the controller 22. In this case, the active I/F 31 relays the transmission command and the reply command by transmitting and receiving a coded signal, such that transmission command and the reply command are coded by the same coding method as the coding method used in the non-contact IC card 3, to and from the contact IC card function section 23A or 23B via the card bus 35.

On the other hand, the passive I/F 32 relays the transmission and reception of a command, which is performed between the reader/writer 2; and the controller 22 and the contact IC card function sections 23A and 23B. For example, the passive I/F 32 relays a command of a transmission (transmission command) with respect to the contact IC card function section 23A or 23B, which is transmitted from the reader/writer 2 by electromagnetic waves (radio waves), and a command of a reply (reply command) from the contact IC card function section 23A or 23B with respect to the transmission command between the reader/writer 2 and the contact IC card function section 23A or 23B via the card bus 35. In this case, the passive I/F 32 relays the transmission command and the reply command by transmitting and receiving a coded signal, such that the transmission command and the reply command are coded by the same coding method as the coding method used in the non-contact IC card 3, to and from the contact IC card function section 23A or 23B via the card bus 35.

The passive I/F 32 becomes operable only when the reader/writer 2 is brought into proximity with the portable terminal 1 and a predetermined or greater power is detected (when a predetermined or greater power is obtained) from the electromagnetic waves (radio waves) radiated from the reader/writer 2.

When the reader/writer 2 transmits the command to the controller 22, the command is transmitted via the card file 34, as will be described later.

The active I/F 31 transmits a predetermined command supplied from the controller 22 to the non-contact IC card 3 and the contact IC card function section 23, and transmits a reply command from the non-contact IC card 3 and the contact IC card function section 23 to the controller 22.

The transmission and reception of a command to and from the non-contact IC card 3 by the active I/F 31 is performed in the following manner. That is, the active I/F 31 codes the command supplied from the controller 22 by a Manchester method, and modulates a carrier wave of a predetermined frequency on the basis of the resultant Manchester coded signal (of the command), thereby transmitting the command in the form of an electromagnetic wave to the non-contact IC card 3 via the antenna coil 33. Furthermore, the active I/F 31 demodulates the modulation wave by load modulation of the non-contact IC card 3 by using a Manchester method, thereby receiving the reply command.

The transmission and reception of a command to and from the contact IC card function section 23 by the active I/F 31 is performed in the following manner. That is, the active I/F 31 codes the command supplied from the controller 22 by a Manchester method and turns on or off an electrical signal that is transmitted through the card bus 35 by a built-in switch (switching element) on the basis of the resultant Manchester coded signal, thereby transmitting the command in the form of an electrical signal represented by Hi (High) or Lo (Low) to the contact IC card function section 23. Furthermore, the active I/F 31 receives the reply command in the form of an electrical signal represented by Hi or Lo from the contact IC card function section 23 via the card bus 35.

The active I/F 31 usually occupies the card bus 35, and is able to transmit and receive a command to and from the contact IC card function section 23 or the card file 34. However, when a prohibition signal is supplied from the passive I/F 32, the card bus 35 is opened so that the passive I/F 32 is able to transmit and receive a command to and from the contact IC card function section 23 or the card file 34.

As described above, the passive I/F 32 relays the transmission and reception of a command, which is performed between the reader/writer 2; and the controller 22 and the contact IC card function sections 23A and 23B. That is, the passive I/F 32 supplies the command from the reader/writer 2 received via the antenna coil 33 to the contact IC card function section 23 or the card file 34. Here, the fact that the passive I/F 32 supplies the command from the reader/writer 2 to the card file 34 means that the command from the reader/writer 2 is supplied to the controller 22. That is, when the command is supplied to the card file 34, the card file 34 notifies the controller 22 of the fact that the command is supplied, and the controller 22 extracts the command via the card bus 35 and the active I/F 31, thereby receiving the command from the reader/writer 2.

Furthermore, the passive I/F 32 transmits the reply command from the contact IC card function section 23 or the card file 34 (controller 22) with respect to the transmission command from the reader/writer 2 to the reader/writer 2 via the antenna coil 33.

The command that is transmitted and received between the passive I/F 32; and the contact IC card function section 23 or the card file 34 is coded by the Manchester method similarly to that of the transmission and reception of a command between the active I/F 31 and the contact IC card function section 23 and is exchanged as a Hi or Lo electrical signal corresponding to the resultant Manchester coded signal via the card bus 35.

The antenna coil 33 exchanges a command with the reader/writer 2 or the non-contact IC card 3 by using electromagnetic waves.

The card file 34 functions as an intermediate buffer for exchanging commands with the passive I/F 32 and the controller 22. That is, when the passive I/F 32 transmits (supplies) a command to the controller 22, the command from the passive I/F 32 is temporarily stored in an internal memory 34A (hereinafter, content (command) stored in the memory 34A is referred to as "data for a controller"). Then, when the data for a controller is stored in the memory 34A, the card file 34 notifies the controller 22 of the fact that the data for a controller is stored in the memory 34A via a USB (Universal Serial Bus) 36. The controller 22 that is notified of the fact that the data for a controller is stored in the memory 34A supplies, to the active I/F 31, a command indicating that the data for a controller is extracted from the memory 34A of the card file 34, and the active I/F 31 extracts the data for a controller from the card file 34 in accordance with the command and supplies the data to the controller 22.

The card bus 35 is a transmission path through which a Hi or Lo electrical signal corresponding to a coded signal such that a command is Manchester coded is transmitted.

In response to a request from the telephone communication processing section (not shown), the controller 22 transmits a command for allowing the non-contact IC card 3 and the contact IC card function section 23A or 23B to perform a predetermined process, and requests the telephone communication processing section to perform a predetermined process in accordance with the command from the non-contact IC card 3 and the contact IC card function section 23.

For example, when the contact IC card function section 23A is an IC card having an electronic money function and the amount of the balance of the electronic money is to be displayed on an LCD (Liquid Crystal Display) (not shown), which is a display means of the portable terminal 1, the controller 22 obtains the amount of balance (balance money) information of the electronic money from the contact IC card function section 23A and supplies it to the telephone communication processing section by transmitting and receiving a command.

Initially, in order to recognize the non-contact IC card 3 and the contact IC card function sections 23A and 23B, which are communication parties for the controller 22, the controller 22 obtains (requests) a card ID (communication apparatus ID) for identifying an IC card, which is assigned in such a manner that each (contact and non-contact) IC card becomes unique, by using a polling command that can be sent back by any IC card receiving the command. The card file 34 also has a card ID similar to that of the IC card, and is handled similarly to the non-contact IC card 3 and the contact IC card function section 23A or 23B.

Here, there is a possibility that, when any plural of the non-contact IC card 3, the contact IC card function sections 23A and 23B, and the card file 34, which are communication parties, make replies to the polling command from the controller 22 at the same timing, it is difficult for the controller 22 to normally receive the commands sent back at the same timing. That is, there is a possibility that the commands from the non-contact IC card 3, the contact IC card function sections 23A and 23B, and the card file 34, which are communication parties, collide with one another and it is difficult for the controller 22 to normally receive the commands.

Therefore, the IC card processing section 11 adopts an anti-collision protocol that is the same as the method used in a non-contact IC card, such as a time slot method and a slot marker method, as a collision avoidance method (anti-collision protocol) when a command is transmitted and received, that makes it possible for the controller 22 to eventually recognize all the communication parties normally even if commands from a plurality of IC cards (non-contact IC card 3, the contact IC card function sections 23A and 23B, and the card file 34) collide with one another. It is assumed in this embodiment that the time slot method is adopted. Also, when the reader/writer 2 recognizes the contact IC card function sections 23A and 23B and the card file 34 of the portable terminal 1, the time slot method is adopted in a similar manner.

Then, the controller 22 exchanges a command with the target party by transmitting the card ID of the transmission target, which is contained in the command, with the non-contact IC card 3, the contact IC card function sections 23A and 23B, and the card file 34 that are detected.

The contact IC card function section 23 (23A or 23B) has a program stored therein, and performs, in accordance with the program, a predetermined process corresponding to the command supplied from the active I/F 31 or the passive I/F 32 via the card bus 35.

For example, the contact IC card function section 23 can function, through the program stored therein, as an IC card for electronic money for performing a receipt and payment of money process for electronic money, an IC card for a ticket that substitutes for a ticket, and an IC card for transportation that substitutes for a ticket of a transportation system such as an electric train.

The contact IC card function section 23 is loadable into and removable from the main unit (of the IC card processing section 11) of the portable terminal 1.

The power-supply section 24 supplies power to each section of the IC card processing section 11.

In the portable terminal 1 configured as described above, the controller 22 transmits a polling command to any IC card that sends back a reply, receives a command sent back with respect to the polling command, and detects (recognizes) the non-contact IC card 3, the contact IC card function sections 23A and 23B, and the card file 34. Then, the controller 22 obtains card IDs for identifying each of the non-contact IC card 3, the contact IC card function sections 23A and 23B, and the card file 34, which are contained in the sent-back command, and transmits a command, to which the card ID of the transmission target is stored, in the subsequent transmission of commands. Thus, the controller 22 can instruct (control) processing with respect to the desired one of the non-contact IC card 3, the contact IC card function sections 23A and 23B, and the card file 34.

Here, the command that is transmitted and received among the reader/writer 2, the non-contact IC card 3, the controller 22, and the contact IC card function section 23 is transmitted and received as command packets in which the command is stored in the data part (Data) shown in FIG. 2, and a preamble, a sync code, a length, and a parity part (CRC) are added to the data part.

More specifically, the command packet, as shown in FIG. 2, is structured in such a manner that a preamble (Preamble) having a length of 6 bytes is arranged at the beginning of the packet, a 2-byte sync code (Sync Code) is arranged after the preamble, a length (Length) indicating about how many bytes the data part becomes is arranged after the sync code, a data part (Data) in which a command is stored is arranged after the length, and a 2-byte parity part (CRC: Cyclic Redundancy Check), which is an error correcting code for error detection, is arranged after the data part.

Then, the command packet shown in FIG. 2 is converted into a coded signal such that it is coded by the Manchester method, and is transmitted and received as a Hi or Lo electrical signal corresponding to the coded signal via the card bus 35.

FIG. 3 shows an electrical signal that is transmitted through the card bus 35 when the transmitted command (packet) and a reply command (packet) for making a reply thereto are transmitted and received.

In FIG. 3, it is assumed that, for the sake of description, for example, the active I/F 31 transmits a command to the contact IC card function section 23A and receives a reply command for it from the contact IC card function section 23A.

In FIG. 3, as a result of the active I/F 31 turning on or off a built-in switch, the electrical signal transmitted through the card bus 35 becomes Hi or Lo. Here, the voltage of the electrical signal of Hi is +V0 [volt], and the voltage of the electrical signal of Lo is a GND voltage.

In a state in which no communication is performed between the active I/F 31 and the contact IC card function section 23A, the electrical signal transmitted through the card bus 35 is Lo, as indicated at interval T1 of FIG. 3. At the onset of starting the transmission of a command, the active I/F 31 transmits a transmission start signal indicating that a command is to be transmitted (communication starts) to the contact IC card function section 23, as indicated at interval T2. This transmission start signal is represented by a Hi signal for a predetermined time. Here, the predetermined time is set as a time sufficiently longer than the time of the Hi or Lo electrical signal corresponding to a logical value 1 or 0 by the Manchester coded signal, respectively, such as, for example, 10 μsec or more.

Thereafter, the active I/F 31 transmits command packets of the command to be transmitted, as indicated at interval T3. After the command is transmitted, as indicated at interval T4, the active I/F 31 controls the switch so that the electrical signal transmitted through the card bus 35 becomes Hi, and waits for a command to be sent back from the contact IC card function section 23.

Then, the contact IC card function section 23 receiving the command from the active I/F 31 causes the card bus 35 in which the electrical signal is Hi to change to a Hi or Lo electrical signal by controlling the built-in switch, and transmits command packets of the command of the reply for the transmitted command, as indicated at interval T5.

The active I/F 31 receiving the command packet of the reply from the contact IC card function section 23 returns it to Lo by controlling the switch that is controlled so that the electrical signal transmitted through the card bus 35 becomes Hi, and a state in which no communication is performed is reached similarly to that at interval T1.

In the manner described above, after the command (packet) is transmitted, the active I/F 31 sets the electrical signal of the card bus 35 to Hi, and the contact IC card function section 23 transmits a reply command (packet) by using the Hi electrical signal supplied from the active I/F 31. Similarly to the active I/F 31, also, the passive I/F 32 transmits a transmission command and thereafter sets the electrical signal of the card bus 35 to Hi. The contact IC card function section 23 transmits a reply command by using the Hi electrical signal supplied from the passive I/F 32.

Such a communication method in a non-contact type IC card communication system may be said that the method in which, after a reader/writer transmits a command to a non-contact-type IC card by using electromagnetic waves, the reader/writer waits with the amplitude of the modulation wave output from the antenna of the reader/writer being fixed, and the non-contact-type IC card performs load modulation on the modulation wave output from the antenna of the reader/writer, thereby sending back a command, is changed to a method in which communication is performed using an electrical signal in place of electromagnetic waves.

Therefore, the contact IC card function section 23 can be configured identically to the non-contact IC card 3 except that an electrical signal is input to the non-contact IC card 3 instead of receiving an electromagnetic wave. That is, it is possible for the contact IC card function section 23 to transmit and receive the command by using a coded signal such that the command is coded by the same coding method as that of the non-contact IC card 3 and possible for the contact IC card function section 23 to use a collision avoidance method (anti-collision protocol) that is the same as that of the non-contact IC card 3.

A description will be given, with reference to FIG. 4, of the exchange of commands by using a time slot method, which is one of collision avoidance methods, when the controller 22 recognizes the non-contact IC card 3, the contact IC card function section 23A, and the card file 34 as communication parties.

In the time slot method, the reception side receiving the polling command that is transmitted determines a timing at which a reply command is transmitted using a random number generated by itself, and transmits a reply command, in which its own card ID is stored, in accordance with the timing.

It is assumed in this embodiment that the contact IC card function section 23A, the contact IC card function section 23B, the card file 34, and the non-contact IC card 3 have card IDs of "ID1A", "ID1B", "ID2", and "ID3", respectively.

In FIG. 4, the contact IC card function section 23B performs the transmission and reception of commands, which is similar to that of the contact IC card function section 23A. Accordingly, illustrations thereof are omitted, and also, descriptions thereof with reference to FIG. 4 are omitted.

Initially, in step S1, the controller 22 transmits a polling command to the active I/F 31.

The active I/F 31 receiving the polling command from the controller 22 broadcasts the polling command in step S2. That is, the active I/F 31 transmits a polling command to the contact IC card function section 23A and the card file 34 via the card bus 35 by using a Hi or Lo electrical signal and also, transmits a polling command to the non-contact IC card 3 via the antenna coil 33 by using electromagnetic waves.

Each of the contact IC card function section 23A, the card file 34, and the non-contact IC card 3 receiving the polling command from the active I/F 31 generate a random number by itself, and determines a timing at which a reply command is transmitted. Here, it is assumed that the timing determined by the card file 34 among the contact IC card function section 23A, the card file 34, and the non-contact IC card 3 becomes a timing at which a reply is sent back at first and a timing that is after that timing and that is almost the same is determined in the contact IC card function section 23A and the non-contact IC card 3.

Therefore, in step S3, the card file 34 transmits a reply command containing its own card ID "ID2" to the active I/F 31 via the card bus 35. Thereafter, in step S4, the contact IC card function section 23A transmits a reply command containing its own card ID "ID1 A" to the active I/F 31 via the card bus 35. In step S5 (at almost the same timing as step S4), the non-contact IC card 3 transmits a reply command containing its own card ID "ID3" to the active I/F 31 via the antenna coil 33.

The active I/F 31 is able to receive the reply command transmitted from the card file 34 in step S3. The receiving timings of the reply commands transmitted from the contact IC card function section 23A and the non-contact IC card 3 in steps S4 and S5 become the same (a collision occurs), and it is difficult to normally receive the commands.

Therefore, in step S6, the active I/F 31 transmits only the card ID "ID2" of the card file 34 to the controller 22 as a reply command for the polling command from the controller 22 in step S1.

In step S7, the controller 22 receiving the command in which the card ID "ID2" of the card file 34 is stored from the active I/F 31 transmits, to the active I/F 31, a mode change command in which the card ID "ID2" of the card file 34 is specified (stored) so as not to make a reply to the polling command.

The active I/F 31 receiving the mode change command broadcasts the mode change command (transmits it to the contact IC card function section 23A, the card file 34, and the non-contact IC card 3) in step S8.

In step S9, the card file 34 having the same card ID as the card ID stored in the mode change command among the contact IC card function section 23A, the card file 34, and the non-contact IC card 3, to which the mode change command is transmitted by broadcast, transmits a reply command indicating that the mode change command is acknowledged to the active I/F 31.

In step S10, the active I/F 31 transmits the reply command from the card file 34, as a reply command for the mode change command from the controller 22 in step S7, to the controller 22.

In step S11, the controller 22 receiving the reply command for the mode change command from the card file 34 in step S10 transmits a polling command similar to that in step S1 described above to the active I/F 31.

The active I/F 31 receiving the polling command from the controller 22 broadcasts the polling command in step S11.

Among the contact IC card function section 23A, the card file 34, and the non-contact IC card 3 receiving the polling command from the active I/F 31, each of the contact IC card function section 23A and the non-contact IC card 3, excluding the card file 34 that is specified so as not to make a reply to the polling command by the mode change command, generates a random number by itself and determines a timing at which the reply command is transmitted.

As a result, in step S12, the contact IC card function section 23A transmits a reply command containing its own card ID "ID1 A" to the active I/F 31 via the card bus 35. Thereafter, in step S13, the non-contact IC card 3 transmits a reply command containing its own card ID "ID3" to the active I/F 31 via the antenna coil 33.

Since the timing at which the contact IC card function section 23A transmits the reply command differs from the timing at which the non-contact IC card 3 transmits the reply command, the active I/F 31 is able to normally receive both the commands.

Then, in step S14, the active I/F 31 transmits, to the controller 22, the card ID "ID1 A" of the contact IC card function section 23A and the card ID "ID3" of the non-contact IC card 3 as reply commands for the polling command from the controller 22 in step S11.

In the manner described above, the controller 22 recognizes (the card IDs) of the contact IC card function section 23A, the card file 34, and the non-contact IC card 3. In the subsequent communication, by transmitting the card ID of each of the contact IC card function section 23A, the card file 34, and the non-contact IC card 3, which is stored in the data part of the command, it becomes possible to communicate with the desired contact IC card function section 23A, the desired card file 34, or the desired non-contact IC card 3. Since the card ID is uniquely assigned to all of the contact IC card, the non-contact IC card, and the card file, it is possible to prevent communication from colliding from one another.

When a contact IC card and a non-contact card exist in addition to the contact IC card function section 23 and the non-contact IC card 3, a polling command is further repeated until an IC card that is not recognized does not exist.

Next, a description will be given, with reference to FIG. 5, of the exchanges of commands by the time slot method when the reader/writer 2 recognizes the card file 34, the contact IC card function section 23A, and the contact IC card function section 23B as communication parties.

Initially, in step S31, the reader/writer 2 transmits a polling command to the passive I/F 32 by using electromagnetic waves.

In step S32, the passive I/F 32 receiving the polling command from the reader/writer 2 broadcasts a polling command. That is, the passive I/F 32 transmits the polling command to the contact IC card function sections 23A and 23B and the card file 34 by using a Hi or Lo electrical signal via the card bus 35.

Each of the contact IC card function sections 23A and 23B and the card file 34 receiving the polling command from the passive I/F 32 generates a random number by itself and determines a timing at which a reply command is transmitted. It is assumed here that the timing determined by the contact IC card function section 23B among the contact IC card function sections 23A and 23B and the card file 34 is a timing at which a reply is made at first and a timing that is after that timing and that is almost the same is determined in the contact IC card function section 23A and the card file 34.

Therefore, in step S33, the contact IC card function section 23B transmits a reply command containing its own card ID "ID1 B" to the passive I/F 32 via the card bus 35. Thereafter, in step S34, the contact IC card function section 23A transmits a reply command containing its own card ID "ID1 A" to the passive I/F 32 via the card bus 35. In step S35 (at almost the same timing as step S34), the card file 34 transmits a reply command containing its own card ID "ID2" to the passive I/F 32 via the card bus 35.

It is possible for the passive I/F 32 to receive the reply command transmitted from the contact IC card function section 23B in step S33. However, the timings of receptions of the reply commands transmitted from the contact IC card function section 23A and the card file 34 in steps S34 and S35 are the same (a collision occurs), and it is difficult to normally receive the commands.

Therefore, in step S36, the passive I/F 32 sends back only the card ID "ID1 B" of the contact IC card function section 23B, as a reply command for the polling command from the reader/writer 2 in step S31, to the reader/writer 2.

In step S37, the reader/writer 2 receiving the reply command in which the card ID "ID1 B" of the contact IC card function section 23B is stored from the passive I/F 32 transmits, to the passive I/F 32, a mode change command in which the card ID "ID1 B" of the contact IC card function section 23B is specified (stored) so as not to make a reply to the polling command.

In step S38, the passive I/F 32 receiving the mode change command broadcasts the mode change command (transmits it to the contact IC card function sections 23A and 23B and the card file 34).

The contact IC card function section 23B having the same card ID as the card ID stored in the mode change command among the contact IC card function sections 23A and 23B and the card file 34, to which the mode change command is transmitted by broadcast, transmits a reply command indicating that the mode change command is acknowledged, to the passive I/F 32 in step S39.

In step S40, the passive I/F 32 transmits, to the reader/writer 2, the reply command from the contact IC card function section 23B as a reply command for the mode change command from the reader/writer 2 in step S37.

The reader/writer 2 receiving the reply command for the mode change command from the contact IC card function section 23B in step S40 transmits a polling command similar to that in step S31 described above to the passive I/F 32 in step S41.

The passive I/F 32 receiving the polling command from the reader/writer 2 broadcasts a polling command in step S42.

Each of the contact IC card function section 23A and the card file 34, excluding the contact IC card function section 23B that is specified so as not to make a reply to the polling command by the mode change command, among the contact IC card function sections 23A and 23B and the card file 34 receiving the polling command from the passive I/F 32, generates a random number by itself and determines a timing at which a reply command is transmitted.

As a result, in step S43, the contact IC card function section 23A transmits a reply command containing its own card ID "ID1 A" to the passive I/F 32 via the card bus 35. Thereafter, in step S44, the card file 34 transmits a reply command containing its own card ID "ID2" to the passive I/F 32 via the card bus 35.

Since the timing at which the contact IC card function section 23A transmits the reply command differs from the timing at which the card file 34 transmits the reply and command, the passive I/F 32 is able to normally receive both the commands.

Then, in step S45, the passive I/F 32 transmits, to the reader/writer 2, the card ID "ID1 A" of the contact IC card function section 23A and the card ID "ID2" of the card file 34, as reply commands for the polling command from the reader/writer 2 in step S41.

In the manner described above, the reader/writer 2 recognizes (the card IDs) of the contact IC card function sections 23A and 23B and the card file 34. In the subsequent communication, the reader/writer 2 transmits each card ID stored in the data part of the command, of the contact IC card function sections 23A and 23B and the card file 34. Thus, it becomes possible for the reader/writer 2 to communicate with the desired contact IC card function sections 23A and 23B and the desired card file 34. Therefore, it is possible to prevent the communication between the reader/writer 2; and the contact IC card function sections 23A and 23B or the card file 34 from colliding with one another.

When a contact IC card exists in addition to the contact IC card function section 23 and the card file 34, the polling command is repeated until there is no longer an IC card that is not recognized.

Next, a description will be given, with reference to FIGS. 6 to 11, of the detailed configuration of each of the active I/F 31, the passive I/F 32, and the contact IC card function section 23 (23A or 23B) of FIG. 1.

Figure 6:
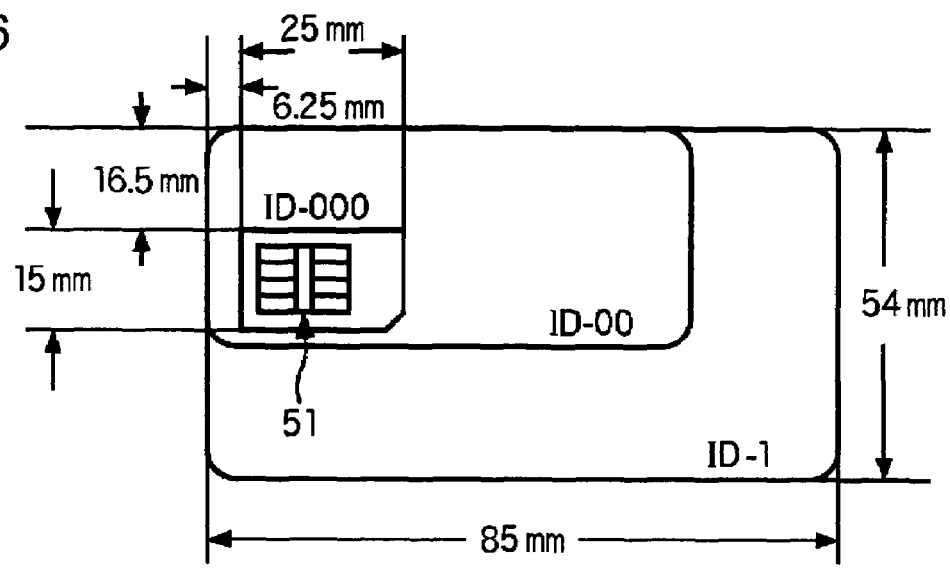
FIG. 6 shows the card shape (outer shape) of a contact IC card function section 23.

FIG. 6 shows the shape (outer shape) of the contact IC card function section 23 attached inside the IC card processing section 11.

The shape of the contact IC card function section 23 can be made to be, for example, a card-type shape (card shape), such as ID-000, ID-00, and ID-01 defined by ISO/IEC 7810, as shown in FIG. 6.

The card shape represented by ID-000 is the same card shape as the card that is generally called an SIM (Subscriber Identify Module) card, and the width×length size is 25×15 (mm). The card shape represented by ID-01 is a card shape of a business card size, such as a credit card, and the width×length size is 85×54 (mm).

With respect to the shape defined by ID-000, ID-00, and ID-01, the location (arrangement) of a contact terminal section 51 through which power is supplied and signals are input and output is determined as shown in FIG. 6.

FIG. 7 shows details of the contact terminal section 51 of FIG. 6 and the connection between the contact terminal section 51 and processing blocks inside the contact IC card function section 23.

The contact IC card function section 23 includes an IC card system block 71 for performing a traditional process and an IC card system block 72 for performing a new process. In the following, the IC card system blocks 71 and 72 of the contact IC card function section 23A are referred to as IC card system blocks 71A and 72A, respectively, and the IC card system blocks 71 and 72 of the contact IC card function section 23B are referred to as IC card system blocks 71B and 72B, respectively.

In the contact terminal section 51 of FIG. 7, each terminal of the IC card system block 71 for performing a traditional process is connected to each terminal of the contact terminal section 51 in the same manner as in the case of the related art. That is, a Vcc terminal of the contact terminal section 51, for supplying a voltage (Vcc) to a circuit inside the contact IC card function section 23, is connected to a Vcc terminal of the IC card system block 71 and also, an RST terminal of the contact terminal section 51, for inputting a reset signal (RST), is connected to an RST terminal of the IC card system block 71. Furthermore, a CLK terminal of the contact terminal section 51, for inputting a clock signal (CLK), is connected to a CLK terminal of the IC card system block 71 and also, an I/O terminal of the contact terminal section 51, for inputting a signal, is connected to an I/O terminal of the IC card system block 71. In addition, a GND terminal of the contact terminal section 51 is connected to a GND terminal of the IC card system block 71.

On the other hand, in the IC card system block 72 for performing a new process, the GND terminal, the RST terminal, and the Vcc terminal of the contact terminal section 51 are connected to the Vcc terminal, the RST terminal, and the GND terminal of the IC card system block 72, respectively. Also, two terminals that are not used as preparatory terminals (RFU) for future use are used as terminals for inputting and outputting a signal to be supplied to the IC card system block 72.

More specifically, the RCK terminal of the contact terminal section 51, for supplying a clock signal (RCK: Remote Clock) by which a Manchester coded signal, which is a signal such that the command supplied to the IC card system block 72 is Manchester coded, is synchronized, is connected to the RCK terminal of the IC card system block 72. Also, an M I/O (M I/O: Manchester coded data input/output) terminal of the contact terminal section 51, through which a Manchester coded signal represented by a Hi or Lo electrical signal is input and output, is connected to an M I/O terminal of the IC card system block 72.

A Vpp terminal of the contact terminal section 51, for supplying a predetermined program-use-only voltage (Vpp), is not used in any of the IC card system blocks 71 and 72.

As shown in FIG. 7, in the contact IC card function section 23, some of the terminals used in the traditional process of the contact terminal 51 are shared, and furthermore, preparatory terminals are used to input and output a signal that is necessary for the new process and that differs from that of the traditional process. Therefore, the traditional process defined by ISO/IEC 7816 can be performed and also, the new process employing the new transmission and reception method can be performed.

A description will now be given, with reference to FIG. 8, of the transmission and reception of commands between the active I/F 31 or the passive I/F 32 of the communication I/F module 21; and the IC card system block 72A of the contact IC card function section 23A or the IC card system block 72B of the contact IC card function section 23B.

Figure 8:
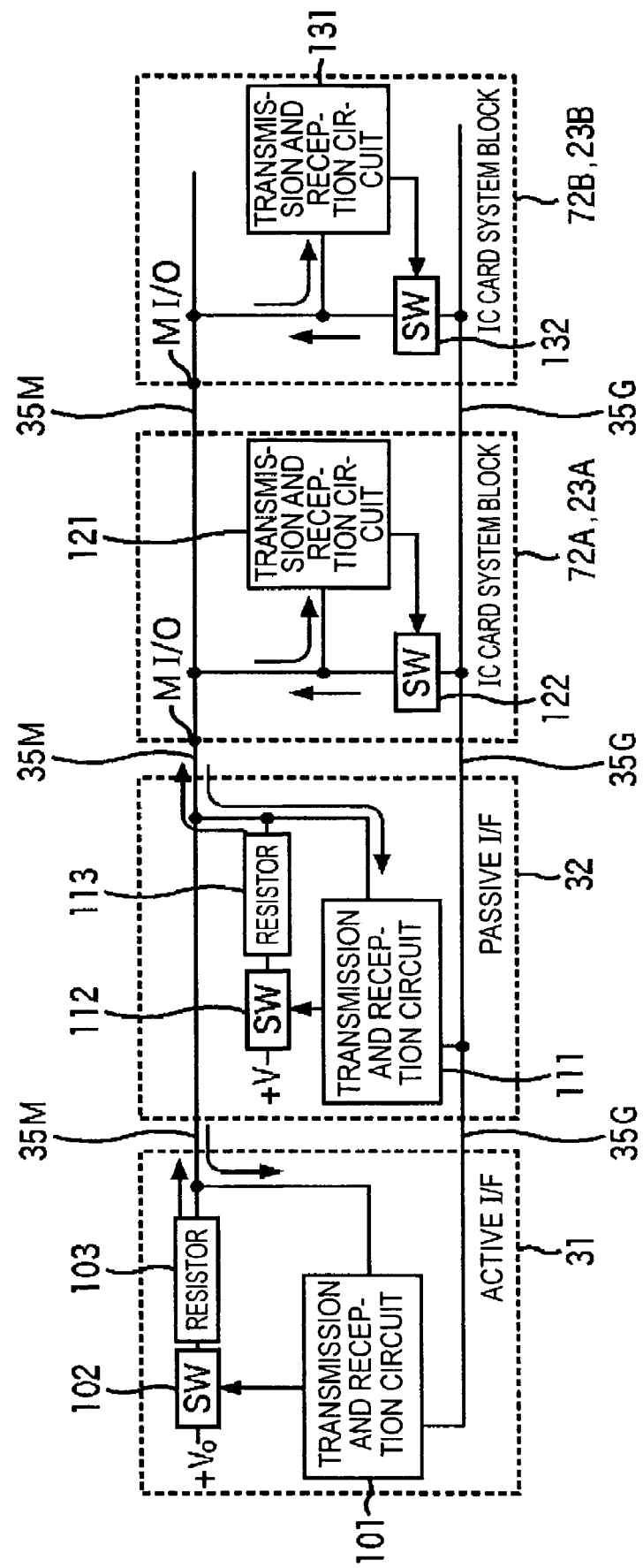
FIG. 8 illustrates the transmission and reception of a command.

In FIG. 8, an example of a case is described in which the active I/F 31 transmits a command to the IC card system block 72A of the contact IC card function section 23A, and the IC card system block 72A transmits a reply command for that command. In addition, the transmission and reception of commands are performed also when the passive I/F 32 instead of the active I/F 31 transmits a command and when the IC card system block 72B of the contact IC card function section 23B instead of the IC card system block 72A of the contact IC card function section 23A receives the command and makes a reply. In FIG. 8, furthermore, it is assumed that the active I/F 31 and the passive I/F 32 have already recognized the contact IC card function sections 23A and 23B.

FIG. 8 shows an example of the detailed configuration of the active I/F 31 and the passive I/F 32 of the communication I/F module 21, the IC card system block 72A of the contact IC card function section 23A, and the IC card system block 72B of the contact IC card function section 23B, and shows an example of the connection of the card bus 35 to each of them.

The active I/F 31 includes a transmission and reception circuit 101 for transmitting and receiving commands, a switch 102 for controlling a Hi or Lo electrical signal, and a load resistor 103.

The passive I/F 32 includes a transmission and reception circuit 111 for transmitting and receiving commands, a switch 112 for controlling a Hi or Lo electrical signal, and a load resistor 113.

The IC card system block 72A of the contact IC card function section 23A includes a transmission and reception circuit 121 for transmitting and receiving commands and a switch 122 for controlling an input electrical signal to Hi or Lo.

The IC card system block 72B of the contact IC card function section 23B includes a transmission and reception circuit 131 for transmitting and receiving commands and a switch 132 for controlling an input electrical signal to Hi or Lo.

The card bus 35 has at least an M I/O signal line 35M and a GND signal line 35G for transmitting a Hi or Lo electrical signal representing a Manchester coded signal. The M I/O signal line 35M of the card bus 35 is connected to the M I/O terminal of the IC card system block 72A and the M I/O terminal of the IC card system block 72B. Furthermore, the GND signal line 35G of the card bus 35 is connected to the GND terminal of the IC card system block 72A and the GND terminal of the IC card system block 72B.

When the active I/F 31 transmits a command to the contact IC card function section 23A, the transmission and reception circuit 101 of the active I/F 31 generates command packets of the command to be transmitted, which is described above with reference to FIG. 2.

Before the generated command packet is transmitted to the contact IC card function section 23A, the transmission and reception circuit 101 transmits a transmission start signal indicating that the command packet is to be transmitted to the contact IC card function section 23A (via the load resistor 103 and the M I/O signal line 35M). That is, the transmission and reception circuit 101 controls the switch (switching element) (SW) 102 so that a transmission start signal represented by a Hi signal for a predetermined time is output to the M I/O signal line 35M via the load resistor 103.

Then, the transmission and reception circuit 101 codes the generated command packet by the Manchester method, and turns on or off (controls) the switch 102 on the basis of the resultant Manchester coded signal. Thus, the transmission and reception circuit 101 transmits the command packet as a Hi or Lo electrical signal to the IC card system block 72A of the contact IC card function section 23A via the load resistor 103 and the M I/O signal line 35M.

As shown in FIG. 8, since the M I/O signal line 35M is connected to the active I/F 31, the passive I/F 32, the contact IC card function section 23A, and the contact IC card function section 23B by using one signal line, the command packet output from the active I/F 31 is transmitted to the contact IC card function sections 23A and 23B. As described above, however, since the card ID indicating the transmission target of the command is stored in the command packet, each of the contact IC card function sections 23A and 23B receiving the transmitted command packet determines whether or not the command packet is a command (packet) destined for itself. Only when the command packet is a command destined for itself, each of the contact IC card function sections 23A and 23B performs a process in accordance with the command. In FIG. 8, since the active I/F 31 is assumed to transmit a command to the contact IC card function section 23A, the card ID of "ID1 A" is stored in the command packet.

After the transmission and reception circuit 101 transmits the command packet, the transmission and reception circuit 101 controls the switch 102 so that a Hi electrical signal is transmitted to the M I/O signal line 35M (set in a state of waiting for a reply command from the contact IC card function section 23A).

The transmission and reception circuit 121 of the IC card system block 72A of the contact IC card function section 23A receives command packets from the active I/F 31, which is represented by a Hi or Lo electrical signal, via the M I/O signal line 35M and the M I/O terminal of the contact terminal 51.

The transmission and reception circuit 121 decodes the received command packet from the active I/F 31 by the Manchester method in order to obtain the resultant command.

Then, the transmission and reception circuit 121 generates a reply command for the obtained command, codes the command packet, in which the command is stored, by the Manchester method, and turns on or off (controls) the switch (switching element) (SW) 122 on the basis of the resultant Manchester coded signal. As a result, the electrical signal of the M I/O signal line 35M, which is set Hi by the active I/F 31, changes to a Hi or Lo state corresponding to the Manchester coded signal.

The transmission and reception circuit 101 of the active I/F 31 receives command packets of a reply from the contact IC card function section 23A, which is changed by the contact IC card function section 23A and which is represented by the Hi or Lo electrical signal of the M I/O signal line 35M.

In the manner described above, the transmission and reception of commands are performed between the active I/F 31 and the IC card system block 72A of the contact IC card function section 23A.

Therefore, it is possible for the active I/F 31 to perform the transmission and reception of commands (communication) to and from the IC card system block 72A or the IC card system block 72B via the card bus 35 (M I/O signal line 35M). Furthermore, similarly to the active I/F 31, it is also possible for the passive I/F 32 to perform the transmission and reception of commands to and from the IC card system block 72A or the IC card system block 72B via the card bus 35.

In the transmission and reception of commands using two or more contact IC cards by the transmission and reception method of the related art, each contact IC card transmits ATR (Answer To Rest) at the same time after a reset is performed, presenting the problem that a collision of communication occurs. Therefore, the reset signal line needs to be provided for each contact IC card. In the method described with reference to FIG. 8, it becomes possible to perform communication by using one M I/O signal line 35M without the contact IC card function sections 23A and 23B colliding with one another.

In the above-described example, a description is given of the transmission and reception of commands between the active I/F 31 or the passive I/F 32; and the contact IC card function section 23A or the contact IC card function section 23B. In addition, it is also possible for the active I/F 31 (the same applies to the passive I/F 32) to allow one contact IC card function section (for example, the contact IC card function section 23A) to transmit a command to another contact IC card function section (for example, the contact IC card function section 23B) by using an inter-IC-card communication command (communication command between data communication apparatuses).

A description will now be given of an example of a case in which the active I/F 31 allows the contact IC card function section 23A to transmit a command to the contact IC card function section 23B by using an inter-IC-card communication command.

Initially, the active I/F 31 generates an inter-IC-card communication command indicating that the IC card system block 72A of the contact IC card function section 23A is made to transmit a command to the IC card system block 72B of the contact IC card function section 23B, and transmits it to the IC card system block 72A of the contact IC card function section 23A. Whether or not the transmitted command is an inter-IC-card communication command can be identified by the command code contained in the data part of the command packet.

After the inter-IC-card communication command is transmitted, the active I/F 31 controls the switch 102 so that the electrical signal of the M I/O signal line 35M is set Hi.

The contact IC card function section 23A receiving the inter-IC-card communication command from the active I/F 31 generates command packets containing a card ID for identifying the contact IC card function section 23A itself in the command packet from the active I/F 31, and transmits the command packet to the contact IC card function section 23B.

The contact IC card function section 23B receiving the command packet transmitted from the contact IC card function section 23A generates a reply command for the command packet, codes the command packet in which the reply command is stored, by the Manchester method, and turns on or off (controls) the switch (switching element) (SW) 132 on the basis of the resultant Manchester coded signal. As a result, the electrical signal of the M I/O signal line 35M, which is set Hi by the active I/F 31, changes to a Hi or Lo state corresponding to the Manchester coded signal.

The transmission and reception circuit 101 of the active I/F 31 receives command packets of the reply from the contact IC card function section 23B, which is changed by the contact IC card function section 23B and which is represented by the Hi or Lo electrical signal of the M I/O signal line 35M. Thereafter, the transmission and reception circuit 101 controls the switch 102 so that the electrical signal of the M I/O signal line 35M is returned to Lo. Furthermore, the contact IC card function section 23A may receive command packets of the reply from the contact IC card function section 23B.

In the manner described above, the active I/F 31 is able to allow the contact IC card function section 23A to communicate with the contact IC card function section 23B in order to receive the result and is able to allow inter-IC-card communication to be performed between the contact IC card function section 23A and the contact IC card function section 23B.

Such an inter-IC-card communication command is effective when, for example, the active I/F 31 does not have a key for accessing the contact IC card function section 23B and the contact IC card function section 23A has the key. That is, even if the active I/F 31 does not directly have a key for accessing the contact IC card function section 23B, if the active I/F 31 can allow the contact IC card function section 23A having the key to access the contact IC card function section 23B, the active I/F 31 can indirectly access the contact IC card function section 23B.

When viewed from the side of the contact IC card function section 23B, there is the advantage that communication is possible with the contact IC card function section 23A without its own key being known to other than the contact IC card function section 23A that already has its own key. That is, for the inter-IC-card communication, there is no need to temporarily transmit a command to the controller in such a manner that a command (data) communicated between IC cards is temporarily transmitted to the controller 22, the controller 22 specified a transmission party, and the command is transmitted to the specified IC card. In consequence, secret communication between contact IC cards becomes possible.

In this embodiment, the number of contact IC card function sections that can be attached to the IC card processing section 11 is set to two. In addition, by making a new M I/O terminal of the contact IC card function section to be connected to the M I/O signal line 35M of the card bus 35, three or more contact IC card function sections can easily be attached to the IC card processing section 11. That is, as a result of a plurality of contact IC card function sections being daisy-chain connected to the same M I/O signal line 35M, three or more contact IC card function sections can easily be attached to the IC card processing section 11.

As a result of a plurality of contact IC card function sections being capable of being attached, a contact IC card function section having different functions can be attached to the portable terminal 1 for each contact IC card function section like, for example, an IC card for electronic money, an IC card for a ticket, or an IC card for transportation. In addition, as a result of clearly separating the functions of each contact IC card function section, there is the advantage in that the responsibility boundary of each contact IC card function section becomes clear. Furthermore, since inter-IC-card communication is possible as described above, the coordination between contact IC cards is possible.

Figure 9:
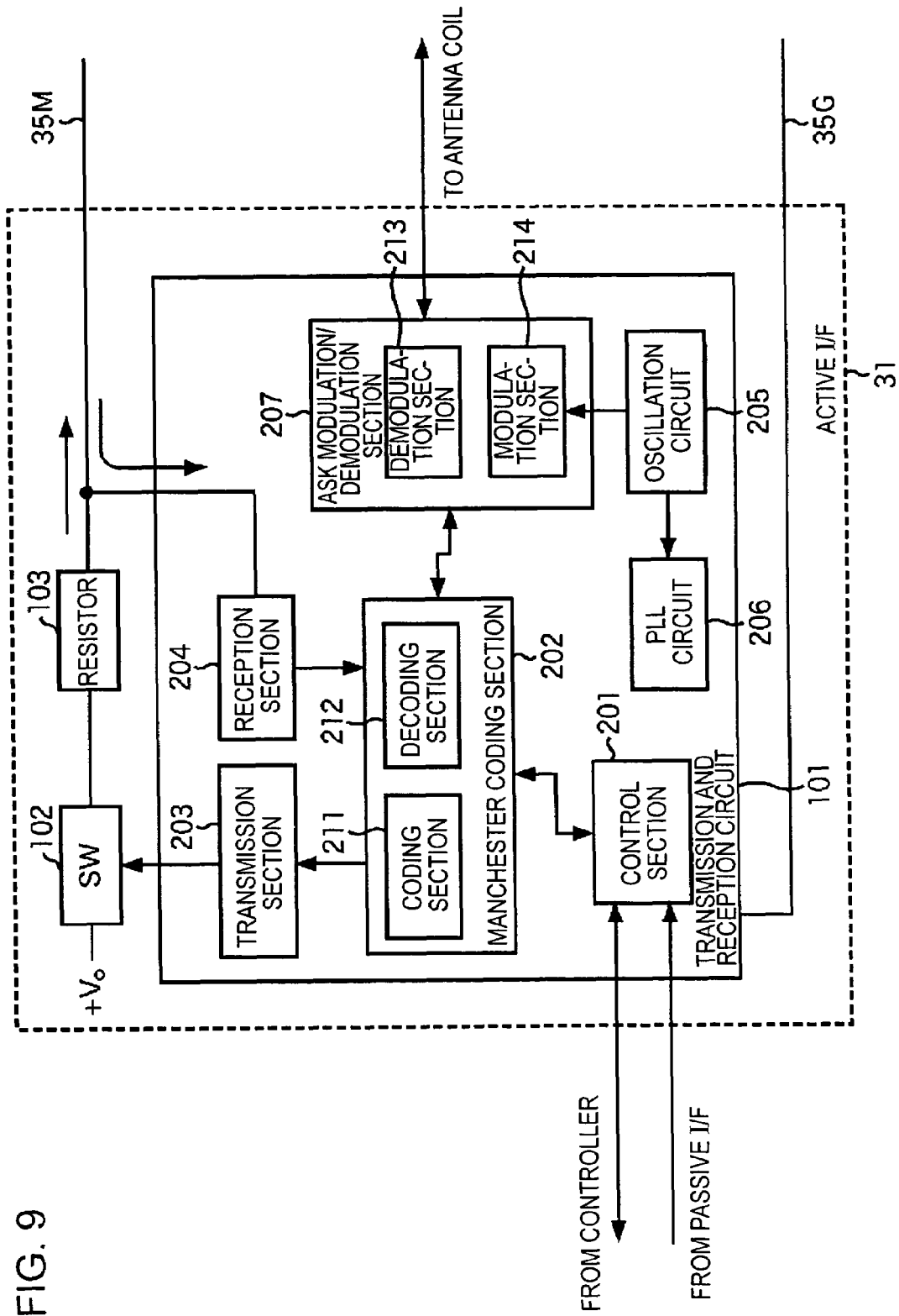
FIG. 9 is a block diagram showing an example of the configuration of an active I/F 31.

FIG. 9 is a block diagram showing an example of the configuration of the active I/F 31, including the detailed configuration of the transmission and reception circuit 101.

The transmission and reception circuit 101 includes a control section 201, a Manchester coding section 202, a transmission section 203, a reception section 204, an oscillation circuit 205, a PLL (Phase Locked Loop) circuit 206, and an ASK (Amplitude Shift Keying) modulation and demodulation section 207.

The control section 201 generates command packets corresponding to the command supplied from the controller 22 and supplies the generated command packet to the Manchester coding section 202. Furthermore, the control section 201 extracts a command stored in the data part of the command packet supplied from the Manchester coding section 202 and supplies the command to the controller 22.

In addition, when a prohibition signal is supplied from the passive I/F 32, the control section 201 stops the subsequent supply of the command packet to the Manchester coding section 202, so that the card bus 35 is opened (the electrical signal of the M I/O signal line 35M becomes Lo).

The Manchester coding section 202 includes a coding section 211 and a decoding section 212. The coding section 211 codes the command packet from the control section 201 by the Manchester method and supplies the resultant Manchester coded signal to the transmission section 203 and the ASK modulation and demodulation section 207. The decoding section 212 decodes the Manchester coded signal supplied from the reception section 204 or the ASK modulation and demodulation section 207 and supplies the signal as command packets to the control section 201.

The transmission section 203 turns on or off (controls) the switch 102 on the basis of the coded signal from the coding section 211, thereby transmitting command packets. That is, a Hi (+V0) or Lo (GND) electrical signal corresponding to the logical value 0 or 1 of the Manchester coded signal, respectively, is output from the switch 102 to the M I/O signal line 35M via the load resistor 103.

When the transmission section 203 starts the transmission of the command packet, the transmission section 203 outputs a transmission start signal indicating that the command packet is to be transmitted to the M I/O signal line 35M. This transmission start signal is set to be, for example, a Hi electrical signal for a predetermined time in the manner described above. When the transmission of the command packet is not performed, the transmission section 203 controls the switch 102 so that the electrical signal of the M I/O signal line 35M becomes Lo.

Furthermore, in the case of the above-described inter-IC-card communication, the transmission section 203 controls the switch 102 so that a Hi electrical signal is output to the M I/O signal line 35M until a reply command for the command transmitted by inter-IC-card communication is received.

The reception section 204 receives a Manchester coded signal such that the command packet represented by a Hi or Lo electrical signal is Manchester-coded via the M I/O signal line 35M, and supplies it to the decoding section 212.

The oscillation circuit 205 generates a clock signal of a predetermined frequency (for example, 13.56 MHz), which is a carrier wave (hereinafter, referred to as a "carrier wave clock signal"), and supplies the clock signal to the PLL circuit 206 and a modulation section 214 of the ASK modulation and demodulation section 207.

The PLL circuit 206 generates a clock signal of a predetermined frequency (hereinafter, referred to as a "Manchester clock signal) on the basis of the carrier wave clock signal supplied from the oscillation circuit 205, and supplies the clock signal to the transmission section 203, the reception section 204, and the ASK modulation and demodulation section 207. In the transmission section 203, the reception section 204, and the ASK modulation and demodulation section 207, on the basis of the Manchester clock signal supplied from the PLL circuit 206, coding, decoding, modulation, and demodulation of the Manchester coded signal are performed. The Manchester clock signal from the PLL circuit 206 is also supplied to the contact IC card function section 23 via the RCK terminal of the contact terminal section 51 of the contact IC card function section 23.

The ASK modulation and demodulation section 207 includes a demodulation section 213 and a modulation section 214. The demodulation section 213 receives an ASK modulation wave that is load-modulated by the non-contact IC card 3 via the antenna coil 33 and supplies the Manchester coded signal of the command that is obtained by demodulating the ASK modulation wave to the decoding section 212. The modulation section 214 generates a carrier wave on the basis of the carrier wave clock signal from the oscillation circuit 205, ASK-modulates the carrier wave on the basis of the Manchester coded signal from the coding section 211, and transmits a command to the non-contact IC card 3 via the antenna coil 33.

The active I/F 31 configured as described above is able to code the command from the controller 22 by the same coding method as the coding method used when transmission and reception to and from the non-contact IC card 3 are performed, and transmits the command to the non-contact IC card 3 and the contact IC card function section 23.

Figure 10:
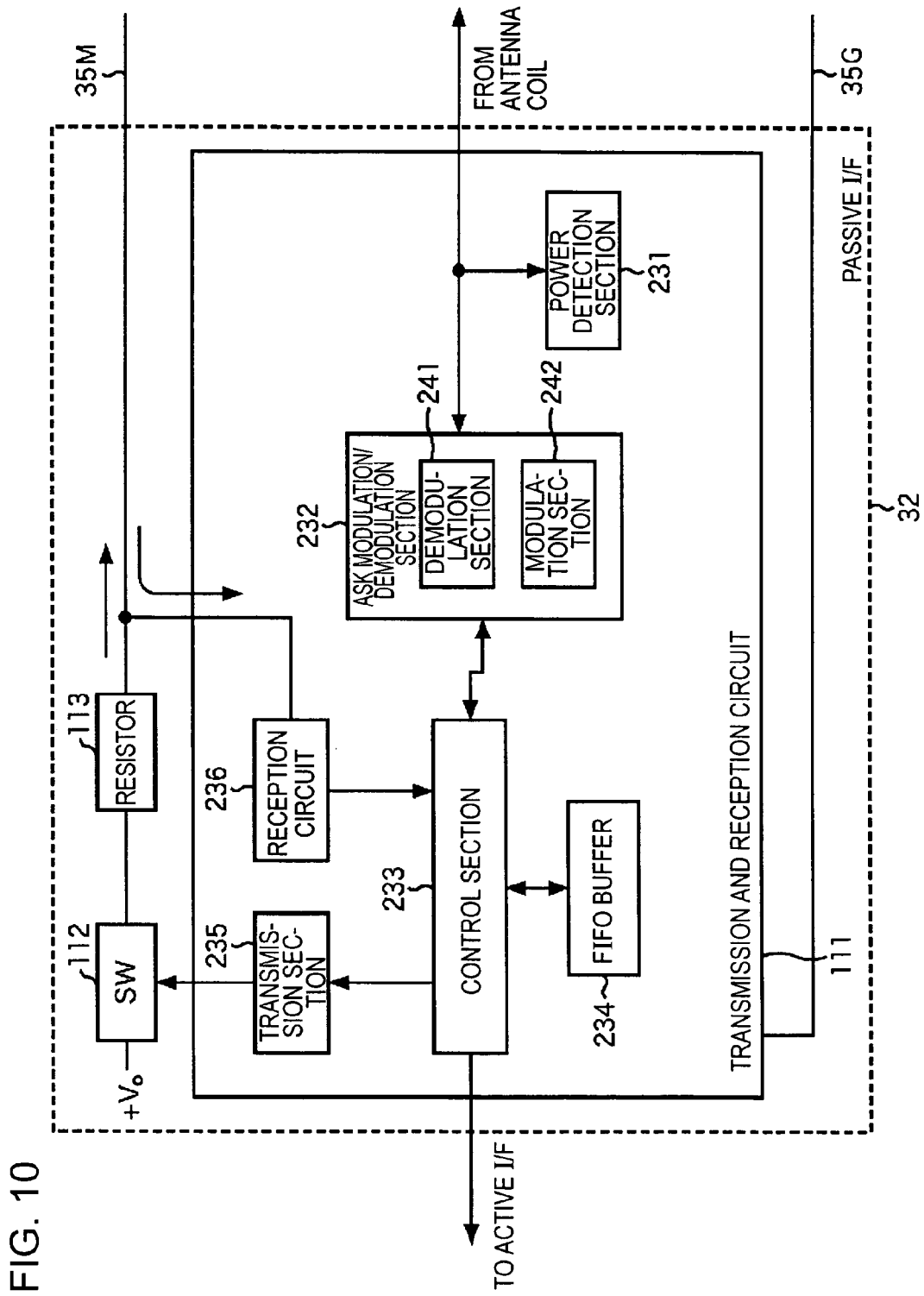
FIG. 10 is a block diagram showing an example of the configuration of a passive I/F 32.

FIG. 10 is a block diagram showing an example of the configuration of the passive I/F 32, including the detailed configuration of the transmission and reception circuit 111.

The transmission and reception circuit 111 includes a power detection section 231, an ASK modulation and demodulation section 232, a control section 233, an FIFO (First In First Out) buffer 234, a transmission section 235, and a reception section 236.

The power detection section 231 receives an ASK modulation wave (radio wave) radiated from the reader/writer 2 via the antenna coil 33 and detects (monitors) power generated from the ASK modulation wave. Then, when the detected power becomes a predetermined or greater power, the power detection section 221 performs control so that the power supplied from the power-supply section 24 is supplied to all the blocks of the passive I/F 32, so that the passive I/F 32 is activated (set to an operable state). Therefore, the passive I/F 32 becomes operable only when the power detected in the power detection section 231 is a predetermined or greater power (the transmission and reception of commands, which are performed among the reader/writer 2, the controller 22, and the contact IC card function sections 23A and 23B, is relayed). The predetermined (or greater) power refers to a minimum of power necessary for the passive I/F 32 to be able to stably (normally) transmit and receive commands to and from the reader/writer 2.

The ASK modulation and demodulation section 232 includes a demodulation section 241 and a modulation section 242. The demodulation section 241 receives an ASK modulation wave (electromagnetic wave) radiated from the reader/writer 2 via the antenna coil 33, and supplies a Manchester coded signal obtained by demodulating the ASK modulation wave to the control section 233. The modulation section 242 varies the load connected in parallel to the antenna coil 33 on the basis of the Manchester coded signal from the control section 233 in order to ASK-modulate the modulation wave whose amplitude is fixed, which is output from the reader/writer 2, thereby transmitting a command to the reader/writer 2.

The control section 233 sequentially supplies the Manchester coded signal (corresponding to the command packet) supplied from the demodulation section 241 of the ASK modulation and demodulation section 232 to the FIFO buffer 234, whereby the Manchester coded signal is stored. Then, when a sync code of the command packet is detected from within the Manchester coded signal supplied from the demodulation section 241, the control section 233 outputs a prohibition signal for prohibiting the transmission of the command to the contact IC card function section 23 to the active I/F 31, so that the card bus 35 is opened.

Furthermore, the control section 233 supplies the Manchester coded signal stored in the FIFO buffer 234 in command packet units to the transmission section 235. Furthermore, the control section 233 supplies the Manchester coded signal corresponding to the command packet sent back from the reception section 236 to the modulation section 242 of the ASK modulation and demodulation section 232.

The transmission section 235 turns on or off (controls) the switch 112 on the basis of the Manchester coded signal from the control section 232, thereby transmitting command packets. That is, an electrical signal of a Hi (+V0) or Lo (GND) state corresponding to the logical value 0 or 1 of the Manchester coded signal, respectively, is output from the switch 112 to the M I/O signal line 35M via the load resistor 113. Also, in the transmission section 235, similarly to the transmission section 203 of the active I/F 31, before the command packet is transmitted, the transmission start signal is output to the M I/O signal line 35M.

The reception section 236 receives a Manchester coded signal such that command packets are Manchester coded, which is represented by a Hi or Lo electrical signal, via the M I/O signal line 35M, and supplies the Manchester coded signal to the control section 233.

In the passive I/F 32 configured as described above, the coded signal of a command that is transmitted and received to and from the reader/writer 22 and the coded signal of a command that is transmitted and received to and from the contact IC card function section 23 are signals that are coded by the same coding method. Therefore, it is possible for the control section 233 to directly supply a coded signal obtained by demodulating the command transmitted from the reader/writer 22 by the demodulation section 241, to the transmission section 235, whereby the signal is transmitted to the contact IC card function section 23. Similarly, it is possible to directly supply the coded signal of the command transmitted from the contact IC card function section 23, to the modulation section 242, whereby the signal is transmitted to the reader/writer 22.

Figure 11:
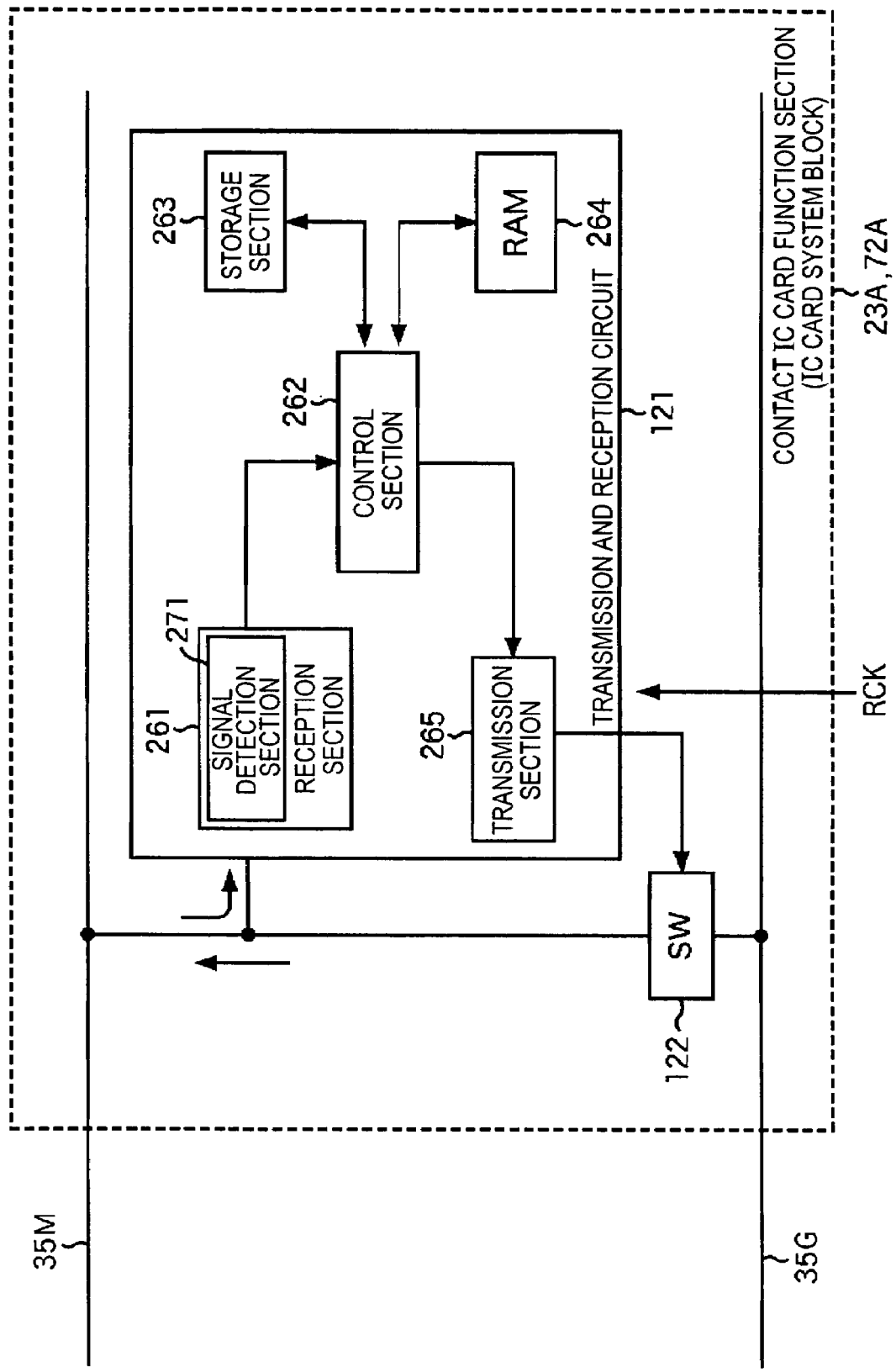
FIG. 11 is a block diagram showing an example of the configuration of an IC card system block 72A of a contact IC card function section 23A.

FIG. 11 is a block diagram showing an example of the configuration of the IC card system block 72A, including the detailed configuration of the transmission and reception circuit 121 of the contact IC card function section 23A. The detailed configuration of the transmission and reception circuit 131 of the IC card system block 72B of the contact IC card function section 23B is identical to the configuration of the transmission and reception circuit 121 of the IC card system block 72A except that the program stored in a storage section 263 (to be described later) differs and the content of processing executed by the processing differs. Accordingly, descriptions of the transmission and reception circuit 131 are omitted.

The transmission and reception circuit 121 includes a reception section 261 having a signal detection section 271, a control section 262, the storage section 263, a RAM (Random Access Memory) 264, and a transmission section 265.

On the basis of the electrical signal input from the M I/O terminal (FIG. 7) of the contact terminal section 51, the signal detection section 271 of the reception section 261 detects a transmission start signal indicating that command packets are to be transmitted. Then, when the transmission start signal is detected, the signal detection section 271 supplies a communication preparatory signal to the control section 262. As a result, the transmission and reception circuit 121 becomes operable.

Furthermore, the reception section 261 receives a command transmitted following the transmission start signal. That is, the reception section 261 receives a Manchester coded signal such that command packets are Manchester coded (a signal that is coded by the same coding method as the coding method used in the non-contact IC card 3), which is represented by the Hi or Lo electrical signal input from the M I/O terminal of the contact terminal section 51. Furthermore, the reception section 261 decodes the received Manchester coded signal and supplies the resultant command packet to the control section 262.

The control section 262 performs a predetermined process corresponding to the command from the reception section 261 in accordance with the program stored in the storage section 263 (hereinafter, referred to as a "process corresponding to the command"). Furthermore, when there is a need to transmit (send back) some kind of command after the process corresponding to the command is performed, the control section 262 generates command packets of the command to be transmitted and supplies the command packet to the transmission section 265. For example, when the transmitted command is an inter-IC-card communication command, the control section 262 generates a new command packet further containing its own card ID in the received command packet, and transmits the command packet to another contact IC card function section 23B.

The storage section 263 is formed of, for example, a non-volatile memory, such as a flash memory, an EEPROM (Electrically Erasable Programmable Read Only Memory), an MRAM (Magnetoresistive Random Access Memory (magneto-resistive memory)), or an FeRAM (ferroelectric memory), and stores programs for processing performed by the IC card system block 72A, and data that is needed to be stored even when the supply of power is stopped. The RAM 264 stores data necessary for executing a program as appropriate. The storage section 263 and the RAM 264 supply the stored program and data to the control section 262 as necessary.

The transmission section 265 codes the command packet supplied from the control section 262 by the Manchester method, and turns on or off (controls) the switch 122 on the basis of the resultant Manchester coded signal, thereby transmitting (sending back) the command packet.

More specifically, after the command packet is transmitted, the active I/F 31 or the passive I/F 32 that transmits the command packet sets the electrical signal of the M I/O signal line 35M to Hi. Therefore, when the switch 122 is turned on by the transmission section 265, the M I/O signal line 35M and the GND signal line 35G are connected to each other, and the electrical signal transmitted through the M I/O signal line 35M becomes Lo. By controlling the switch 122, the electrical signal of a Hi (+V0) or Lo (GND) state corresponding to the logical value 0 or 1 of the Manchester coded signal, respectively, is transmitted to the GND signal line 35G.

The decoding and coding of the Manchester coded signal in the reception section 261 and the transmission section 265 are performed on the basis of a clock signal (Manchester clock signal) input from the RCK terminal of the contact terminal section 51 (FIG. 3).

The IC card system block 72A of the contact IC card function section 23A, which is configured as described above, is able to transmit and receive commands to and from the active I/F 31 and the passive I/F 32 on the basis of a coded signal coded by the same coding method as the coding method used when transmission and reception are performed to and from the non-contact IC card 3 via the M I/O signal line 35M of the card bus 35.

Next, a description will be given, with reference to the flowchart in FIG. 12, of a transmission process of the active I/F 31 when the active I/F 31 transmits the command received from the controller 22 to the non-contact IC card 3 and the contact IC card function section 23A.

Initially, in step S101, the control section 201 determines whether or not a command is received from the controller 22, and waits until it is determined that a command is received.

When it is determined in step S101 that the command is received from the controller 22, the process proceeds to step S102, where the control section 201 generates command packets corresponding to the command supplied from the controller 22 and supplies the generated command packet to the coding section 211. The process then proceeds to step S103.

In step S103, the coding section 211 codes the command packet from the control section 201 by the Manchester method and supplies the resultant Manchester coded signal to the transmission section 203 and the modulation section 214. The process then proceeds to step S104.

In step S104, the transmission section 203 receives the Manchester coded signal from the coding section 211 and thereafter controls the switch 102 so that a transmission start signal is transmitted to the contact IC card function section 23A. The process then proceeds to step S105.

In step S105, the transmission section 203 controls the switch 102 so that the electrical signal of the M I/O signal line 35M becomes Hi or Lo on the basis of the Manchester coded signal from the coding section 211, and transmits command packets of the command received from the controller 22 to the contact IC card function section 23A. The process then proceeds to step S106.

In step S106, the modulation section 214 generates a carrier wave on the basis of the carrier wave clock signal from the oscillation circuit 205, ASK-modulates the carrier wave on the basis of the Manchester coded signal from the coding section 211, and transmits the command packet of the command received from the transmission controller 22 to the non-contact IC card 3 via the antenna coil 33. The process then proceeds to step S107.

In step S107, the transmission section 203 controls the switch 102 so that the electrical signal transmitted through the M I/O signal line 35M becomes Hi, and the processing is completed.

Figure 12:
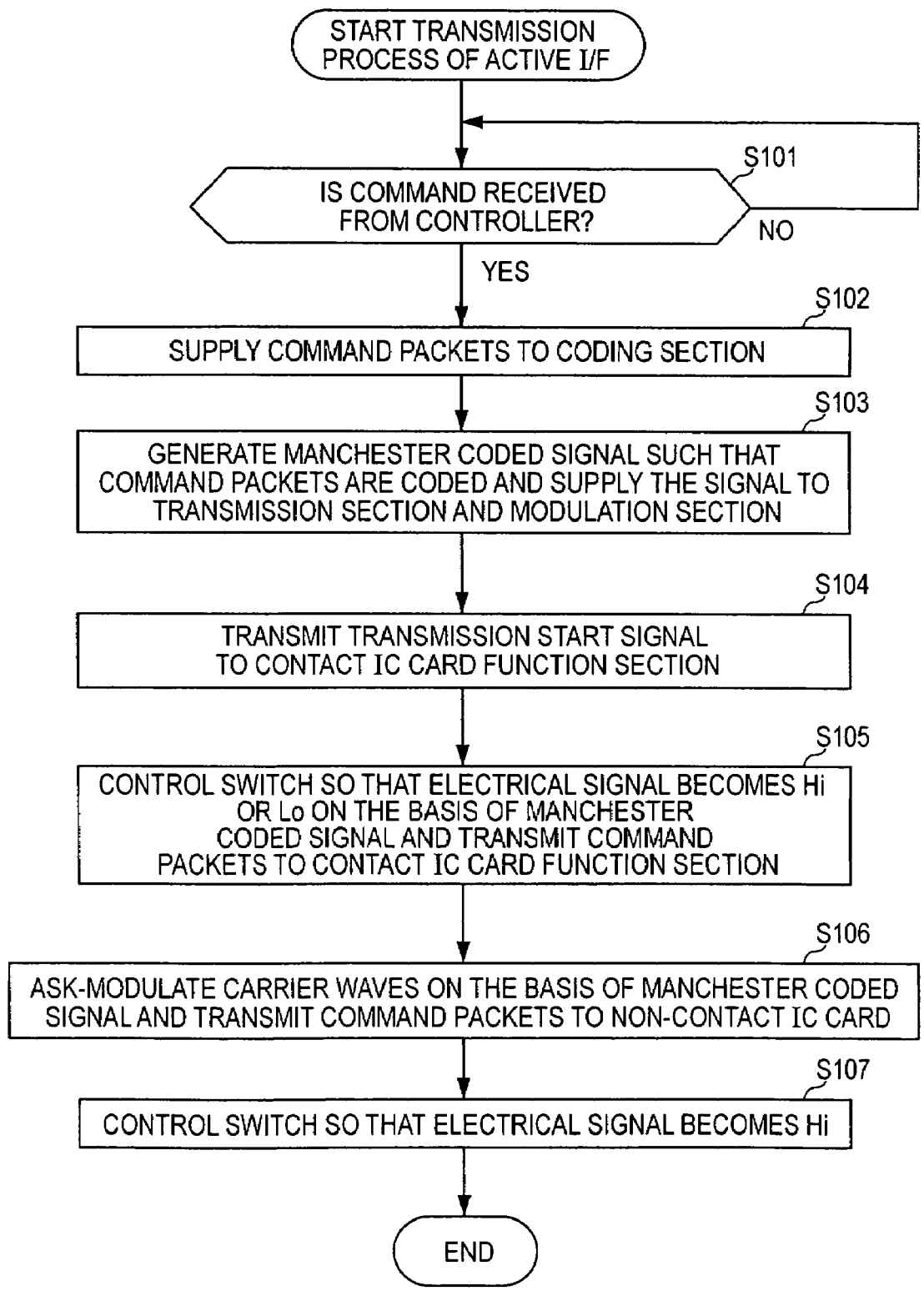
FIG. 12 is a flowchart illustrating a transmission process of the active I/F 31.

In the transmission process of FIG. 12, the processing of steps S104 and S105 and the processing of step S106 can be performed in the order in which the command packets are received, either of the processings may be performed earlier, and the processings can also be performed simultaneously. The processing of step S107 can be performed anytime after the processing of step S105 is completed.

Next, a description will be given, with reference to the flowchart in FIG. 13, of the transmission and reception processes of the contact IC card function section 23A, for receiving command packets transmitted in the transmission process of the active I/F 31 of FIG. 12 and for transmitting a command of a reply (reply command) for the command packet.

Initially, in step S121, the signal detection section 271 of the IC card system block 72A monitors an electrical signal input from the M I/O terminal of the contact terminal section 51, which is connected to the M I/O signal line 35M of the card bus 35, in order to determine whether or not a transmission start signal indicating that command packets are to be transmitted is detected, and waits until it is determined that the transmission start signal is detected.

When it is determined in step S121 that the transmission start signal is detected, the process proceeds to step S122, where the signal detection section 271 supplies a communication preparatory signal to the control section 262 in order to activate the transmission and reception circuit 121 so as to place the transmission and reception circuit 121 in an operable state.

After the processing of step S122, in step S123, the reception section 261 receives a Manchester coded signal such that the command packet is Manchester coded, which is represented by a Hi or Lo electrical signal, via the M I/O signal line 35M of the card bus 35. Furthermore, in step S123, the reception section 261 decodes the received Manchester coded signal, receives the resultant command packet from the active I/F 31, and supplies the command packet to the control section 262. The process then proceeds to step S124.

In step S124, the control section 262 performs a process corresponding to the command from the active I/F 31, generates a reply command, generates command packets of the reply command, and supplies the command packet to the transmission section 265. The process then proceeds to step S1125.

In step S125, the transmission section 265 codes the command packet by the Manchester method. In step S1126, the transmission section 265 controls the switch 122 so that the electrical signal of the M I/O signal line 35M of the card bus 35 becomes Hi or Lo on the basis of the Manchester coded signal coded by the Manchester method, transmitting (sending back) the command packet. The processing is then completed.

Figure 14:
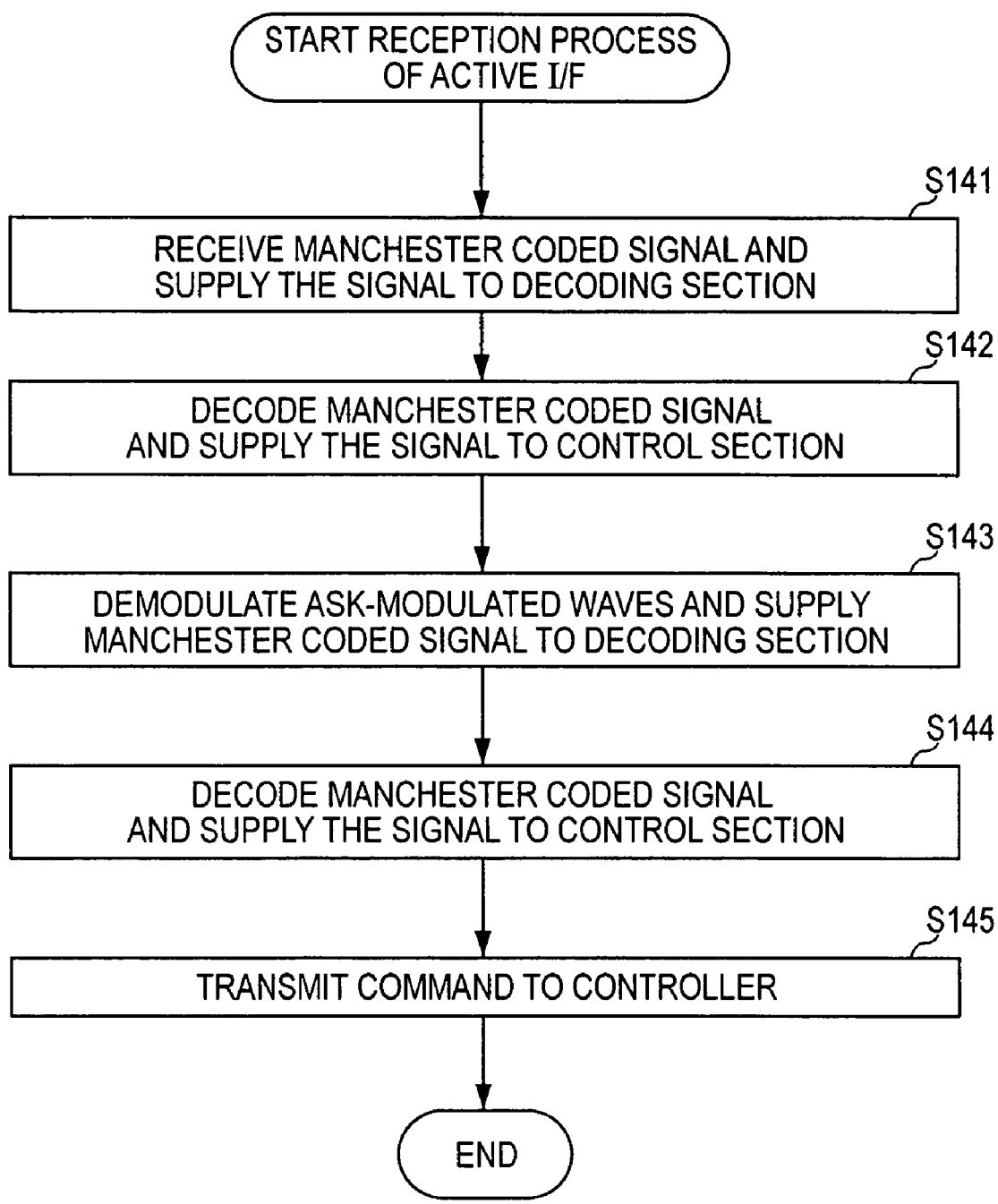
FIG. 14 is a flowchart illustrating the reception process of the active I/F 31.

Next, a description will be given, with reference to the flowchart in FIG. 14, of the reception process of the active I/F 31, for receiving a command of a reply from the non-contact IC card 3 and the contact IC card function section 23 with respect to a command transmitted from the transmission process of FIG. 12.

Initially, in step S141, the reception section 204 receives a Manchester coded signal such that command packets of a reply command from the contact IC card function section 23A is Manchester coded, which is represented by a Hi or Lo electrical signal, via the M I/O signal line 35M of the card bus 35, and supplies the Manchester coded signal to the decoding section 212. The process then proceeds to step S142.

In step S142, the decoding section 212 decodes the Manchester coded signal from the reception section 204, and supplies the signal as command packets from the contact IC card function section 23A to the control section 201. The process then proceeds to step S143.

In step S143, the demodulation section 213 supplies, to the decoding section 212, a Manchester coded such that the command packet from the non-contact IC card 3 is Manchester coded, which is obtained by receiving an ASK modulation wave that is load-modulated by the non-contact IC card 3 via the antenna coil 33 and by demodulating the ASK modulation wave. The process then proceeds to step S144.

In step S144, the decoding section 212 decodes the Manchester coded signal from the demodulation section 213, and supplies the signal as command packets from the non-contact IC card 3 to the control section 201. The process then proceeds to step S145. The processing of steps S141 and S142 and the processing of steps S143 and S144 can be performed in the order in which the reception section 204 or the demodulation section 213 receives the command, either of the processings may be performed earlier, or the processings can be performed simultaneously.

In step S145, the control section 201 extracts a command from each of the command packet from the contact IC card function section 23A and the command packet from the non-contact IC card 3, and transmits (supplies) the command to the controller 22. The processing is then completed.

A description will now be given, with reference to the flowchart in FIG. 15, of the transmission process of the passive I/F 32 when the passive I/F 32 transmits command packets received from the reader/writer 2 to the contact IC card function section 23A.

Initially, in step S161, the power detection section 231 receives an ASK modulation wave (electromagnetic wave) radiated from the reader/writer 2 via the antenna coil 33, and detects (monitors) power generated from the ASK modulation wave. Then, the power detection section 231 waits until the detected power is determined to be a predetermined or greater power.

When it is determined in step S161 that the detected power is a predetermined or greater power, the process proceeds to step S162, where the power detection section 221 performs control so that the power supplied from the power-supply section 24 is supplied to all the blocks of the passive I/F 32, and activates the passive I/F 32 (places the passive I/F 32 in an operable state). The process then proceeds to step S163.

In step S163, the demodulation section 241 receives the ASK modulation wave from the reader/writer 2 via the antenna coil 33, and supplies a Manchester coded signal of the command packet from the reader/writer 2, which is obtained by demodulating the ASK modulation wave, to the control section 233. The process then proceeds to step S164.

In step S164, the control section 233 supplies the Manchester coded signal (corresponding to the command packet) supplied from the demodulation section 241 to the FIFO buffer 234, whereby the Manchester coded signal is stored. The process then proceeds to step S165.

In step S165, the control section 233 determines whether or not the sync code of the command packet has already been detected from the Manchester coded signal supplied from the demodulation section 241. When it is determined that the sync code of the command packet has not yet been detected, the process proceeds to step S166.

In step S166, the control section 233 determines whether or not the sync code of the command packet is detected from the Manchester coded signal supplied from the demodulation section 241. When the sync code of the command packet has not been detected, the process returns to step S163, and the processing of step S163 and subsequent steps is repeated.

On the other hand, when the sync code of the command packet is detected from the Manchester coded signal supplied from the demodulation section 241 in step S166, the process proceeds to step S167, where the control section 233 supplies a prohibition signal to the active I/F 31 so that the card bus 35 is opened. The process then returns to step S163, and processing of step S163 and subsequent steps is repeated.

When it is determined in step S165 that the sync code of the command packet has already been detected from the Manchester coded signal supplied from the demodulation section 241, the process proceeds to step S168, where the control section 233 determines whether or not the Manchester coded signal supplied from the demodulation section 241 is stored in packet units in the FIFO buffer 234.

When it is determined in step S168 that the Manchester coded signal has not been stored in packet units in the FIFO buffer 234, in other words, when the Manchester coded signal stored in the FIFO buffer 234 is not yet in packet units, the process returns to step S163, and processing of step S163 and subsequent steps is repeated.

On the other hand, when the Manchester coded signal stored in the FIFO buffer 234 in step S168 is in packet units, the process proceeds to step S169, where the control section 233 supplies the Manchester coded signal stored in the FIFO buffer 234 to the transmission section 235. The process then proceeds to step S170.

In step S170, the transmission section 235 receives the Manchester coded signal from the control section 233, and thereafter controls the switch 112, thereby transmitting a transmission start signal to the contact IC card function section 23A. The process then proceeds to step S171.

In step S171, the transmission section 235 controls the switch 112 so that the electrical signal of the M I/O signal line 35M becomes Hi or Lo on the basis of the Manchester coded signal from the control section 233, and transmits the command packet received from the reader/writer 2 to the contact IC card function section 23A. The process then proceeds to step S172.

In step S172, the transmission section 235 controls the switch 112 so that the electrical signal transmitted through the M I/O signal line 35M becomes Hi, and the processing is then completed.

Figure 13:
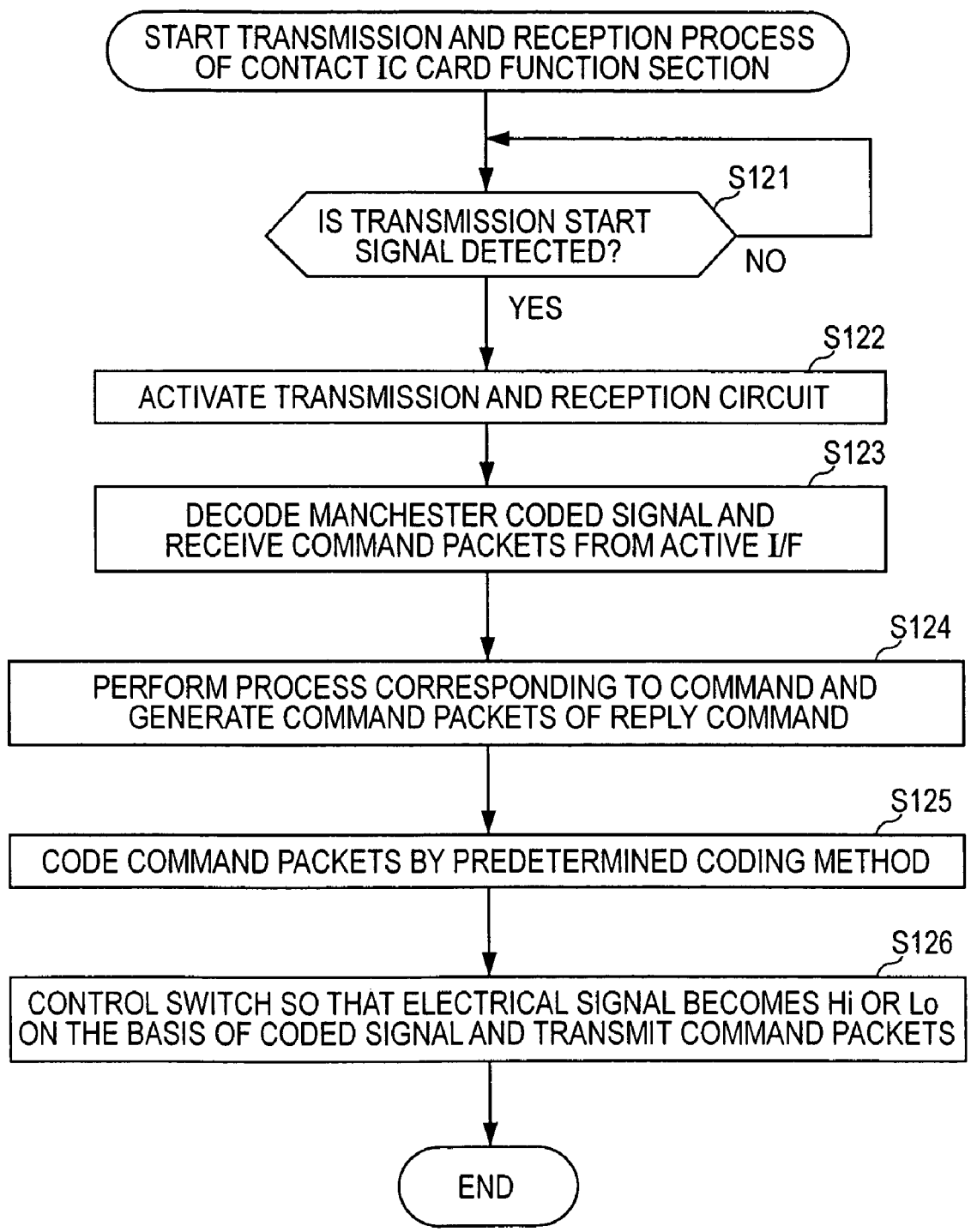
FIG. 13 is a flowchart illustrating the transmission and reception process of the contact IC card function section 23A.
Figure 15:
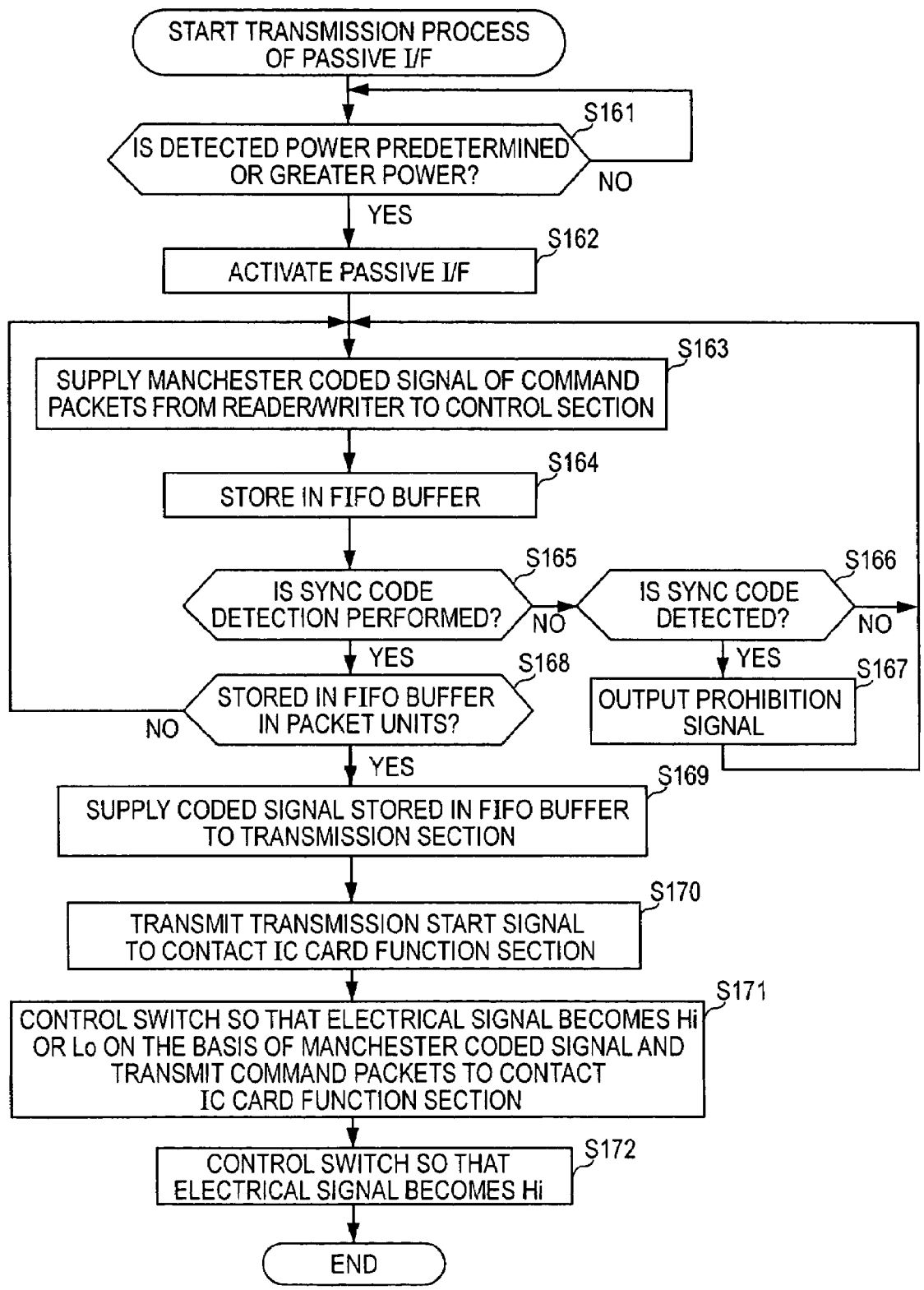
FIG. 15 is a flowchart illustrating the transmission process of the passive I/F 32.

The transmission and reception processes of the contact IC card function section 23A with respect to the transmission process of the passive I/F 32 of FIG. 15 are identical to the transmission and reception processes of FIG. 13. Accordingly, descriptions thereof are omitted.

Figure 16:
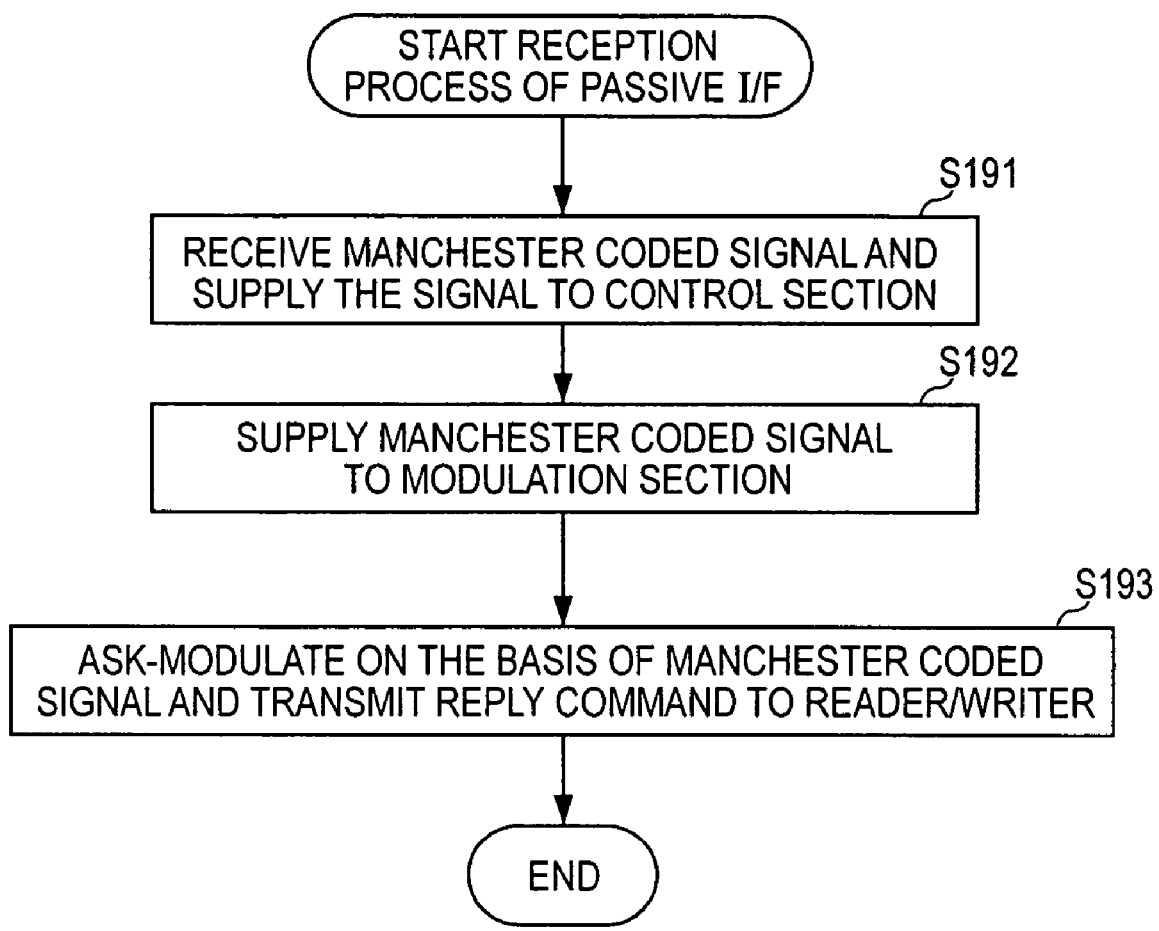
FIG. 16 is a flowchart illustrating the reception process of the passive I/F 32.

A description will now be given, with reference to the flowchart in FIG. 16, of the reception process of the passive I/F 32, for receiving a command of a reply from the contact IC card function section 23A with respect to the transmission process of FIG. 15.

Initially, in step S191, the reception section 236 receives a Manchester coded signal such that command packets of the reply command from the contact IC card function section 23A is Manchester coded, which is represented by a Hi or Lo electrical signal, via the M I/O signal line 35M of the card bus 35, and supplies the Manchester coded signal to the control section 236. The process then proceeds to step S192.

In step S192, the control section 233 supplies the Manchester coded signal from the reception section 236 to the modulation section 242, and the process then proceeds to step S193.

In step S193, by varying the load connected in parallel to the antenna coil 33 on the basis of the Manchester coded signal from the control section 233, the modulation section 242 ASK-modulates the modulation wave whose amplitude is fixed, which is output from the antenna of the reader/writer 2, and transmits a command of the reply from the contact IC card function section 23A to the reader/writer 2. The processing is then completed.

As has thus been described, the active I/F 31 (or the passive I/F 32) of the IC card processing section 11 transmits and receives, in the form of an electrical signal, a coded signal such that a command (packet) is coded by the same coding method as the coding method used in the non-contact IC card 3 between the contact IC card function section 23A or 23B and the controller 22 (or the reader/writer 2) via the M I/O signal line 35M of the card bus 35. Therefore, it is possible for the contact IC card function sections 23A and 23B and the non-contact IC card 3 to transmit and receive commands by using the same transmission and reception method. That is, an interface through which a non-contact IC card and one or more contact IC cards can communicate with one another by using the same protocol can be used.

In the related art, when communication is to be performed with a plurality of non-contact IC cards, the distance at which communication is possible with the non-contact IC card becomes short and communication may become impossible due to the problem of power consumption. Therefore, it is difficult to communicate with a plurality of non-contact IC cards. In this embodiment, since power for communicating with a plurality of non-contact IC cards 3 can be supplied from the power-supply section 24, it is possible for the IC card processing section 11 to stably communicate with not only one non-contact IC card 3, but also with a plurality of non-contact IC cards.

In the above-described embodiments, also, even when a device in compliance with NFC (Near Field Communication) incorporating an IC chip for performing communication similar to that of a non-contact IC card is used instead of the reader/writer 2, it is possible for the IC card processing section 11 to perform identical communication.

It is also possible to reverse the logic of the Hi or Lo electrical signal transmitted through the card bus 35.

In this specification, the steps described in the flowcharts include not only processing which is carried out chronologically in the written order but also processing which is executed in parallel or individually although it is not necessarily processed chronologically.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A transmission and reception apparatus for transmitting and receiving a command to and from a first non-contact-type data communication apparatus and a second non-contact-type data communication apparatus and a contact-type data communication apparatus, the transmission and reception apparatus comprising:
   a transmission path for transmitting an electrical signal, to which one or more of the contact-type data communication apparatuses are connected electrically;
   generation means for generating a first transmission command for controlling the contact-type data communication apparatus;
   first relay means for relaying a first transmission command from the generation means and a first reply command from the contact-type data communication apparatus and from the first non-contact-type data communication apparatus with respect to the first transmission command between at least one of the contact-type data communication apparatus and the first non-contact-type data communication apparatus, and the generation means via the transmission path,
   wherein the first relay means relays the first transmission command and the first reply command by transmitting and receiving a coded signal, such that the first transmission command and the first reply command are coded by a coding method, the coding method being associated with the first non-contact-type data communication apparatus, to and from the contact-type data communication apparatus via the transmission path; and
   second relay means for relaying a second transmission command for the contact-type data communication apparatus, which is transmitted in the form of radio waves from the second non-contact-type communication apparatus, and a second reply command with respect to the second transmission command from the contact-type data communication apparatus between the other data communication apparatus and the contact-type data communication apparatus via the transmission path,
   wherein the second relay means relays the second transmission command and the second reply command by transmitting and receiving a coded signal, such that the second transmission command and the second reply command are coded by a coding method, the coding method being associated with the second non-contact-type data communication apparatus, to and from the contact-type data communication apparatus via the transmission path.

2. The transmission and reception apparatus according to claim 1, wherein the first relay means transmits a transmission start signal indicating that the first transmission command is to be transmitted to the contact-type data communication apparatus via the transmission path before the first transmission command is transmitted to the contact-type data communication apparatus.

3. The transmission and reception apparatus according to claim 1, wherein, when the contact-type data communication apparatus is made to transmit a command to another contact-type data communication apparatus, the generation means generates the first transmission command indicating the fact of command transmission so as to contain a command code of a communication command between the data communication apparatuses,
   the first relay means transmits the first transmission command containing the command code of the communication command between the data communication apparatuses to the contact-type data communication apparatus, and
   the contact-type data communication apparatus receives the first transmission command containing the command code of the communication command between the data communication apparatuses via the transmission path and transmits the command to the other contact-type data communication apparatus.

4. The transmission and reception apparatus according to claim 1, wherein, as an anti-collision protocol when a command is transmitted and received to and from the contact-type data communication apparatus, the same anti-collision protocol as that of at least one of the first non-contact-type data communication apparatus and the second non-contact-type data communication apparatus is used.

5. The transmission and reception apparatus according to claim 1, wherein the second relay means further comprises power detection means for detecting power from the radio waves, and
   when the power detected by the power detection means is a predetermined or greater power, the second relay means relays the second transmission command and the second reply command.

6. The transmission and reception apparatus according to claim 1, wherein the second relay means further comprises output means for outputting, to the first relay means, a prohibition signal for prohibiting the transmission of the first transmission command for the contact-type data communication apparatus when a predetermined code is detected from within the coded signal of the second transmission command.

7. A transmission and reception method for use with a transmission and reception apparatus for transmitting and receiving a command to and from a first non-contact-type data communication apparatus and a second non-contact-type data communication apparatus and a contact-type data communication apparatus, the transmission and reception apparatus including a transmission path for transmitting an electrical signal, to which one or more of the contact-type data communication apparatuses are connected electrically; generation means for generating a first transmission command for controlling the contact-type data communication apparatus; and relay means for relaying a first transmission command from the generation means and a reply command with respect to the first transmission command from the contact-type data communication apparatus and from the first non-contact-type data communication apparatus between the contact-type data communication apparatus and between the first non-contact-type data communication apparatus and the generation means via the transmission path and for relaying a second transmission command from the second non-contact-type communication apparatus to the contact-type data communication apparatus, the transmission and reception method comprising the steps of:

generating a transmission command for controlling the contact-type data communication apparatus;

relaying the transmission command and a reply command by transmitting and receiving a coded signal, such that the transmission command and the reply command are coded by a coding method, the coding method being associated with the first non-contact-type data communication apparatus, to and from the contact-type data communication apparatus via the transmission path; and relaying a second transmission command for the contact-type data communication apparatus, which is transmitted in the form of radio waves from the second non-contact-type communication apparatus, and a second reply command with respect to the second transmission command from the contact-type data communication apparatus between the other communication apparatus and the contact-type data communication apparatus via the transmission path, wherein the second relay means relays the second transmission command and the second reply command by transmitting and receiving a coded signal, such that the second transmission command and the second reply command are coded by a coding method, the coding method being associated with the second non-contact-type data communication apparatus, to and from the contact-type data communication apparatus via the transmission path.

8. A contact-type data communication apparatus for transmitting and receiving a command to and from a transmission and reception apparatus capable of transmitting and receiving a command also to and from a first non-contact-type data communication apparatus and a second non-contact-type data communication apparatus, the contact-type data communication apparatus comprising:

electrical signal input means for inputting an electrical signal;

detection means for detecting a transmission start signal indicating that a transmission command is to be transmitted from the transmission and reception apparatus on the basis of the electrical signal input from the electrical signal input means;

receiving means for receiving, as a transmission command, a coded signal such that the transmission command is coded by a coding method, the coding method being associated with at least one of the first non-contact-type data communication apparatus and the second non-contact-type data communication apparatus, which is represented by the electrical signal input from the electrical signal input means, when the transmission start signal is detected by the detection means;

relay means for relaying the transmission command from the first non-contact-type communication apparatus and the second non-contact-type communication apparatus to the contact-type data communication apparatus; and transmission means for coding a reply command, which is a command of a reply with respect to the transmission command, by the coding method and transmitting the reply command.

9. The contact-type data communication apparatus according to claim 8, further comprising generation means for generating a new transmission command further containing a communication apparatus ID for identifying the contact-type data communication apparatus itself in the transmission command when a command code contained in the transmission command received by the receiving means represents a communication command between data communication apparatuses for transmitting the command to another contact-type data communication apparatus, wherein the transmission means codes the new transmission command by the coding method and transmits the transmission command to the other contact-type data communication apparatus.

10. A transmission and reception method for use with a contact-type data communication apparatus for transmitting and receiving a command to and from a transmission and reception apparatus that includes electrical signal input means for inputting an electrical signal and that is capable of transmitting and receiving a command also to and from a first non-contact-type data communication apparatus and a second non-contact-type data communication apparatus, the transmission and reception method comprising the steps of:

detecting a transmission start signal indicating that a transmission command is to be transmitted from the transmission and reception apparatus on the basis of an electrical signal input from the electrical signal input means;

receiving, as a transmission command, a coded signal such that the transmission command is coded by a coding method, the coding method being associated with at least one of the first non-contact-type data communication apparatus and the second non-contact-type data communication apparatus, which is represented by the electrical signal input from the electrical signal input means, when the transmission start signal is detected;

relaying a transmission command from the first non-contact-type communication apparatus and the second non-contact-type communication apparatus to the contact-type data communication apparatus; and coding a reply command, which is a command of a reply with respect to the transmission command, by the coding method and transmitting the reply command.

11. A transmission and reception apparatus for transmitting and receiving a command to and from a first non-contact-type data communication apparatus and a second non-contact-type data communication apparatus and a contact-type data communication apparatus, the transmission and reception apparatus comprising:

a transmission path for transmitting an electrical signal, to which one or more of the contact-type data communication apparatuses are connected electrically;

a generation section generating a first transmission command for controlling the contact-type data communication apparatus;

a first relay section relaying a first transmission command from the generation section and a first reply command from the contact-type data communication apparatus and from the first non-contact-type data communication apparatus with respect to the first transmission command between at least one of the contact-type data communication apparatus and the second non-contact-type data communication apparatus, and the generation section via the transmission path, wherein the first relay section relays the first transmission command and the first reply command by transmitting and receiving a coded signal, such that the first transmission command and the first reply command are coded by a coding method, the coding method being associated with the first non-contact-type data communication apparatus, to and from the contact-type data communication apparatus via the transmission path; and second relay section for relaying a second transmission command for the contact-type data communication apparatus, which is transmitted in the form of radio waves from the second non-contact-type communication apparatus, and a second reply command with respect to the second transmission command from the contact-type data communication apparatus between the other apparatus and the contact-type data communication apparatus via the transmission path, wherein the second relay section relays the second transmission command and the second reply command by transmitting and receiving a coded signal, such that the second transmission command and the second reply command are coded by a coding method, the coding method being associated with the non-contact-type data communication apparatus, to and from the contact-type data communication apparatus via the transmission path.

12. A contact-type data communication apparatus for transmitting and receiving a command to and from a transmission and reception apparatus capable of transmitting and receiving a command also to and from a first non-contact-type data communication apparatus and a second non-contact-type data communication apparatus, the contact-type data communication apparatus comprising:

an electrical signal input section inputting an electrical signal;

a detection section detecting a transmission start signal indicating that a transmission command is to be transmitted from the transmission and reception apparatus on the basis of the electrical signal input from the electrical signal input section;

a reception section receiving, as a transmission command, a coded signal such that the transmission command is coded by a coding method associated with the first non-contact-type data communication apparatus, which is represented by the electrical signal input from the electrical signal input section, when the transmission start signal is detected by the detection section;

a relaying section relaying a transmission command from the second non-contact-type communication apparatus to the contact-type data communication apparatus; and a transmission section coding a reply command, which is a command of a reply with respect to the transmission command, by the coding method and transmitting the reply command.

* * * * *